US012647249B2

(12) United States Patent (10) Patent No.: US 12,647,249 B2
Hoshizuki et al. (45) Date of Patent: Jun. 2, 2026

(54) ENCRYPTION PROCESSING APPARATUS AND ENCRYPTION PROCESSING METHOD

(71) Applicant: AXELL CORPORATION, Tokyo (JP)

(72) Inventors: Yusuke Hoshizuki, Tokyo (JP); Kotaro Matsuoka, Tokyo (JP)

(73) Assignee: AXELL CORPORATION, Tokyo (JP)

( * ) Notice: Subject to any disclaimer, the term of this patent is extended or adjusted under 35 U.S.C. 154(b) by 205 days.

(21) Appl. No.: 18/510,475

(22) Filed: Nov. 15, 2023

(65) Prior Publication Data

US 2024/0187210 A1     Jun. 6, 2024

(30) Foreign Application Priority Data

Nov. 24, 2022    (JP) .................................. 2022-187427

(51) Int. Cl.
H04L 9/00          (2022.01)
H04L 9/06          (2006.01)
(52) U.S. Cl.
CPC ............ H04L 9/0618 (2013.01); H04L 9/008 (2013.01)
(58) Field of Classification Search
CPC .............................. H04L 9/0618; H04L 9/008
See application file for complete search history.

(56) References Cited

U.S. PATENT DOCUMENTS

2018/0375639 A1* 12/2018 Lauter ..................... H04L 9/008
2021/0019428 A1*  1/2021 Liu ......................... H04L 9/008

2021/0328766 A1* 10/2021 No ......................... H04L 9/3093
2022/0376890 A1* 11/2022 Eom ...................... H04L 9/0891
2024/0176903 A1*  5/2024 Takahashi ............... H04L 9/008

OTHER PUBLICATIONS

Tew et al., Multi-Precision_Integer_Arithmetic_Processing_Using_Arithmetic_Circuit_Homomorphic_Encryption (Year: 2020).*
Morimura et al., Improved_Integer-wise_Homomorphic_Comparison_and_Division_based_on_Polynomial_Evaluation, Aug. 2022 (Year: 2022).*
Chillotti, TFHE_Deep_Dive_-_Part_I_-_Ciphertext_types, May 2022 (Year: 2022).*

(Continued)

*Primary Examiner* — Noura Zoubair
*Assistant Examiner* — Lawrence Q Truong
(74) *Attorney, Agent, or Firm* — MASUVALLEY & PARTNERS; Peter Martinez

(57) ABSTRACT

An encryption processing apparatus processing a ciphertext is disclosed. The ciphertext is a fully homomorphic ciphertext that has a value obtained by adding an error with a predetermined variance to a predetermined value, as a plaintext associated with an integer and that enables a predetermined operation between integers without decryption. The apparatus includes a processor that executes a process including: applying a first polynomial to a first ciphertext to obtain a second ciphertext having a polynomial as a plaintext; performing a homomorphic operation of a ciphertext having a second polynomial as a plaintext for the second ciphertext to obtain a third ciphertext having a polynomial as a plaintext; and applying the third ciphertext as a polynomial to a fourth ciphertext to obtain a fifth ciphertext.

11 Claims, 13 Drawing Sheets

(56)           References Cited

OTHER PUBLICATIONS

Chillotti, Ilaria, et al., "TFHE: Fast Fully Homomorphic Encryption over the Torus," *Journal of Cryptology*, 33:34-91, 2020, 62 pages.
Okada, H. et al., "Integerwise Functional Bootstrapping on TFHE," *Springer Nature Switzerland AG*, 2020, 107 pages.
Micciancio, D. et al., "Bootstrapping in FHEW-like Cryptosystems," *Duality Technologies*, Aug. 27, 2020, pp. 25 pages.

* cited by examiner

FIG.1

CONTROLLER 10

COMMUNICATION UNIT 25

RECEIVING UNIT 11

INPUT UNIT 26

STORAGE UNIT 60 20

FIRST OPERATION UNIT (FIRST HOMOMORPHIC OPERATION) 12

SECOND OPERATION UNIT (SECOND HOMOMORPHIC OPERATION) 13

THIRD OPERATION UNIT (THIRD HOMOMORPHIC OPERATION) 14

FOURTH OPERATION UNIT (FOURTH HOMOMORPHIC OPERATION) 15

FIFTH OPERATION UNIT (FIFTH HOMOMORPHIC OPERATION) 16

SIXTH OPERATION UNIT (SIXTH HOMOMORPHIC OPERATION) 17

FIRST CALCULATION UNIT (BINARY Gate Bootstrapping) 41

SECOND CALCULATION UNIT (BINARY Gate Bootstrapping) 42

THIRD CALCULATION UNIT (BINARY Gate Bootstrapping) 43

FOURTH CALCULATION UNIT (BINARY Gate Bootstrapping) 44

OUTPUT UNIT 35

OFFSET ADDED ca

NO OFFSET ADDED

| | CARRY $\phi(c5)$ | BORROW $\phi(c6)$ | POSITION ON CIRCLE GROUP $\phi(c7)$ | $\phi(c8) = \phi(c7 + c6 - c5)$ |
|---|---|---|---|---|
| $a - b > t - 1$ | PRESENT 0 | ABSENT 1 | LEFT HALF PLANE 0 | 1 |
| $t - 1 \geqq a - b \geqq 0$ | ABSENT 1 | ABSENT 1 | RIGHT HALF PLANE 1 | 1 |
| $0 > a - b \geqq -t$ | ABSENT 1 | ABSENT 1 | LEFT HALF PLANE 0 | 0 |
| $-t > a - b$ | ABSENT 1 | PRESENT 0 | RIGHT HALF PLANE 1 | 0 |

EXAMPLE 1

$ca'=-ca+(0,1/4t)$ ~S101

$r1=BlindRotate(ca',F1(X))$ ~S102

$r1'=r1 \times 2-(0,F1(X))$ ~S103

$cc=ca+cb-(0,1/4t)$ ~S104

$r2=BlindRotate(cc,r1')$ ~S105

$c3=SampleExtract(r2)$ ~S106

$c2=SampleExtract(r1)$ ~S107

$c4=c3+2 \times c2$ ~S108

$r3=BlindRotate(c4,F1'(X))$ ~S109

$cd=SampleExtract(r3)$ ~S110

$ce=SampleExtract(r3)$ ~S111

$c5=cd+(0,1/2t)$ ~S112

$c6=ce+(0,1/2t)$ ~S113

RETURN

EXAMPLE 2

$ca'=-ca+(0,1/4t)$ —S201

$r11=BlindRotate(ca',F2(X))$ —S202

$r11'=r11 \times 2-(0,F3(X))$ —S203

$cc'=\lfloor 2n(ca+cb-(0,1/4t)) \rfloor$ —S204

$r2'=BlindRotate(cc',r1')$ —S205

$c3'=SampleExtract(r2')$ —S206

$c2'=SampleExtract(r11)$ —S207

$c4'=c3'+2 \times c2'$ —S208

$r3=BlindRotate(c4',F2'(X))$ —S209

$cd'=SampleExtract(r3)$ —S210

$ce'=SampleExtract(r3)$ —S211

$cf=SampleExtract(r3)$ —S212

$c5=cd'+(0,1/2t)$ —S213

$c6=ce'+(0,1/2t)$ —S214

$c7=cf+(0,1/2t)$ —S215

$c8=c7+c6-c5$ —S216

RETURN

ENCRYPTION PROCESSING APPARATUS AND ENCRYPTION PROCESSING METHOD

RELATED APPLICATIONS

This application is based upon and claims the benefit of priority to Japanese Patent Application No. 2022-187427, filed on Nov. 24, 2022, with the Japanese Patent Office, the entire contents of which are incorporated herein by reference in its entirety.

FIELD OF THE INVENTION

The embodiments discussed herein are related to an encryption processing apparatus, an encryption processing method, and a non-transitory computer-readable recording medium.

BACKGROUND OF THE INVENTION

Homomorphic encryption is an encryption technique that can process encrypted data without decrypting the encrypted data.

Encryption that allows an operation between ciphertexts, corresponding to addition of plaintexts, to be performed is additive homomorphic encryption, and encryption that allows an operation between ciphertexts, corresponding to multiplication of plaintexts, to be performed is multiplicative homomorphic encryption.

There are conventionally known additive homomorphic encryption that performs only an additive operation (addition and subtraction) while a finite cyclic group is regarded as an integer and multiplicative homomorphic encryption that performs only a multiplicative operation (multiplication) while a finite cyclic group is regarded as an integer.

For the finite cyclic group, an integral multiple can be obtained by repeating addition, and therefore an integral multiple by a plaintext can be calculated. Also, exponentiation by a plaintext can be calculated by repeating multiplication.

There are also known ring homomorphic encryption that processes both an additive operation and a multiplicative operation while ciphertexts remain encrypted and fully homomorphic encryption (FHE) that can perform all operations including addition and multiplication.

One of known fully homomorphic encryption techniques is fully homomorphic encryption based on the LWE (Learning with Errors) problem, which is configured by adding a small error to a plaintext in an encryption process to such an extent that there is no problem in decryption.

In the fully homomorphic encryption based on the LWE problem, an error is accumulated as an operation is repeated, and therefore, bootstrapping for reducing an error component while the error component remains encrypted is performed before the error becomes too large to allow decryption.

The computation time of bootstrapping occupies most of the computation time required for an operation of fully homomorphic encryption. Further, the amount of computation is large in bootstrapping, because bootstrapping handles a large amount of data. Therefore, in an operation of fully homomorphic encryption, the operation result may not be able to be obtained within a practical time.

A scheme that drastically improves this problem is TFHE (Fast Fully Homomorphic Encryption over the Torus) described in TFHE: Fast Fully Homomorphic Encryption over the Torus. Journal of Cryptology, 33:34-91, 2020, I.

Chillotti, N. Gama, M. Georgieva, and M. Izabachene (referred to as "Chillotti et al., 2020" in the following descriptions).

Homomorphic encryption includes Bit-wise type homomorphic encryption that can take two values as a plaintext and based on a logical operation, and Integer-wise type homomorphic encryption having a whole integer as a plaintext as one ciphertext. TFHE described in Chillotti et al., 2020 is the Bit-wise type.

The plaintext in TFHE is a real number from 0 to 1 associated with a circle group. Therefore, by associating sections obtained by dividing the range from 0 to 1 of the circle group with integers in turn, TFHE can be applied as Integer-wise type homomorphic encryption having an integer as the plaintext. For example, Integerwise Functional Bootstrapping on TFHE, 2020, Hiroki Okada, Shinsaku Kiyomoto, and Carlos Cid can be mentioned.

If TFHE is used as the Integer-wise type, one ciphertext can retain a plurality of bits of information, thus enabling a more complicated operation to be performed in one homomorphic operation. The number of operation times in the entire system can thus be reduced largely.

Further, it is known that values of functions are substituted into a test vector polynomial for Bootstrapping and used as a LUT, whereby a desired univariate function can be evaluated. For example, Bootstrapping in FHEW-like Cryptosystems, 2020, Daniele Micciancio and Yuriy Polyakov can be mentioned.

Further, there is a demand for performing an operation of comparing ciphertexts in Integer-wise type TFHE. This is because comparison between TLWE ciphertexts are widely applicable and can be applied to, for example, homomorphic multiple precision arithmetic for multiple precision integers which regards one TLWE ciphertext as one division unit.

In multiple precision subtraction in the multiple precision arithmetic, subtraction and a carry-down operation are repeated for each division unit in order from a lower division unit, as in a case where a human performs subtraction by column subtraction. This carry-down operation requires a homomorphic comparison operation.

In addition, in multiple precision addition, a carry-up process is performed contrary to multiple precision subtraction. This carry-up operation also requires a homomorphic comparison operation.

Not only in the multiple precision arithmetic but also regarding a ciphertext representing one integer value, a comparison operation is necessary in addition and subtraction for knowing the magnitude relation between plaintexts of ciphertexts.

OBJECTS AND SUMMARY OF THE INVENTION

According to an aspect of the embodiments, an encryption processing apparatus processes a ciphertext, the ciphertext being a fully homomorphic ciphertext that has a value obtained by adding an error with a predetermined variance to a predetermined value, as a plaintext associated with an integer and that enables a predetermined operation between integers without decryption. The encryption processing apparatus includes a processor that executes a process including: applying a first polynomial to a first ciphertext to obtain a second ciphertext having a polynomial as a plaintext; performing a homomorphic operation of a ciphertext having a second polynomial as a plaintext for the second ciphertext to obtain a third ciphertext having a polynomial as a plaintext; and applying the third ciphertext as a polynomial to a fourth ciphertext to obtain a fifth ciphertext.

The objects and advantages of the invention will be realized and achieved by the elements and combinations specifically pointed out in the claims.

It is to be understood that both the foregoing general description and the following detailed description are exemplary and illustrative and are not intended to limit the invention as claimed.

BRIEF DESCRIPTION OF DRAWINGS

FIG. 1 is an explanatory diagram of a functional configuration of an encryption processing apparatus of the present embodiment;

DESCRIPTION OF EMBODIMENTS

Figure 2:
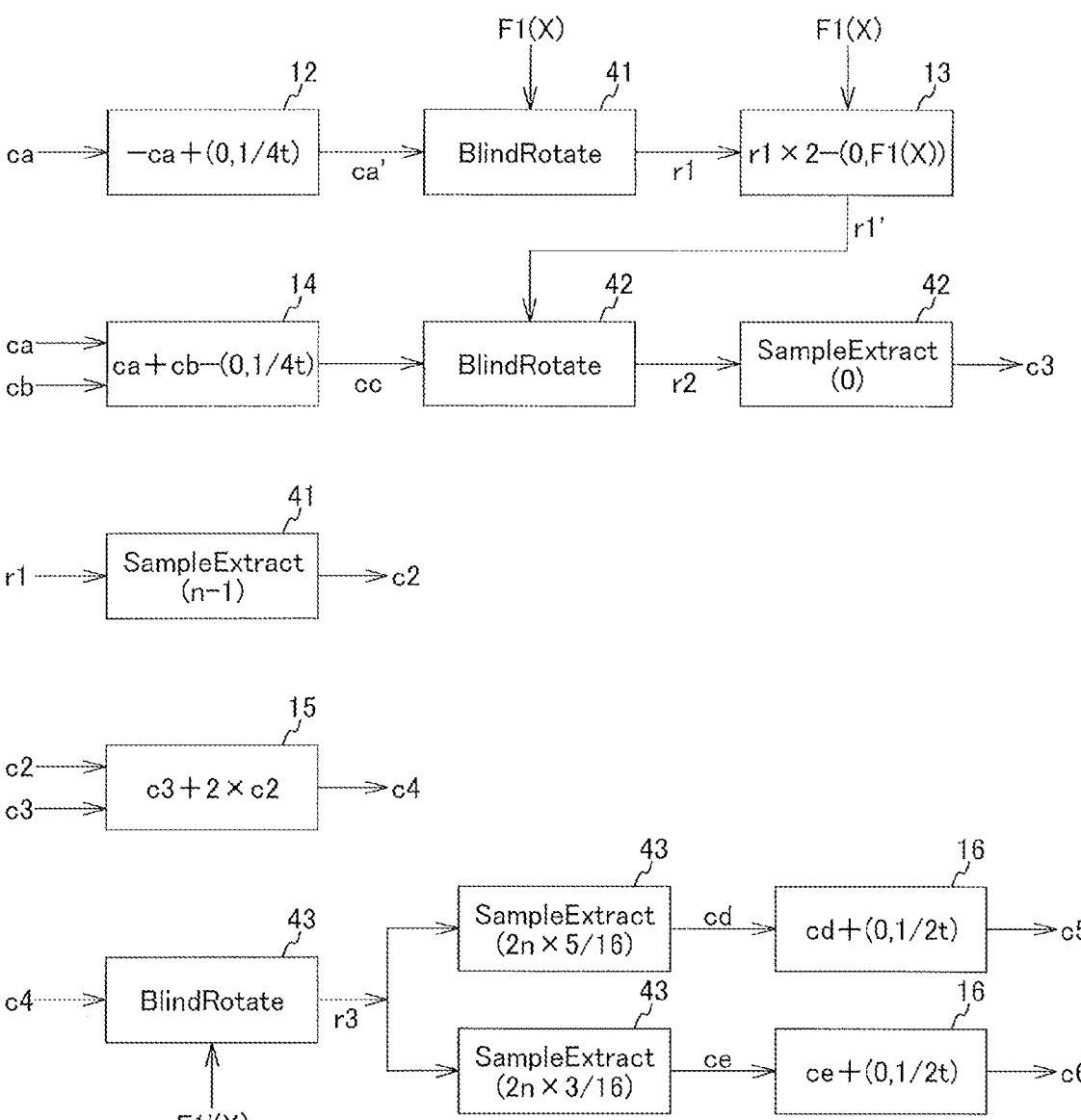
FIG. 2 is a detailed explanatory diagram of an operation process based on the functional configuration in FIG. 1.

Embodiments of the present invention are described below in detail with reference to the drawings.

In the following descriptions, an alphanumeric character sandwiched by [ ] indicates that it is a vector. An alphanumeric character sandwiched by { } indicates that it is a set.

Further, in the present specification, a "logical operation" refers to a binary or multi-value operation.

FIG. 1 is an explanatory diagram of a functional configuration of an encryption processing apparatus of the present embodiment.

An encryption processing apparatus 1 includes a controller 10, a storage unit 20, a communication unit 25, and an input unit 26.

The controller 10 includes a receiving unit 11, a first operation unit 12, a second operation unit 13, a third operation unit 14, a fourth operation unit 15, a fifth operation unit 16, and a sixth operation unit 17.

The controller 10 also includes a first Bootstrapping unit (calculation unit) 41, a second Bootstrapping unit (calculation unit) 42, a third Bootstrapping unit (calculation unit) 43, a fourth Bootstrapping unit (calculation unit) 44, and an output unit 35.

The receiving unit 11 receives input of a ciphertext that is an object of an operation, via the communication unit 25 or the input unit 26. Alternatively, the receiving unit 11 receives input of a ciphertext from another process executed by the encryption processing apparatus 1.

The first operation unit 12 performs a first homomorphic operation for an input ciphertext received by the receiving unit 11.

The second operation unit 13 performs a second homomorphic operation for a ciphertext output in the course of a process by the first Bootstrapping unit 41.

The third operation unit 14 performs a third homomorphic operation for two ciphertexts input thereto that are objects of comparison.

The fourth operation unit 15 performs a fourth homomorphic operation for a ciphertext output from the first Bootstrapping unit 41 and a ciphertext output from the second Bootstrapping unit 42.

The fifth operation unit 16 performs a fifth homomorphic operation for a ciphertext output from the third Bootstrapping unit 43.

The sixth operation unit 17 performs a sixth homomorphic operation between ciphertexts output from the fifth operation unit 16.

The first Bootstrapping unit 41 performs first Gate Bootstrapping for a ciphertext output from the first operation unit 12.

The second Bootstrapping unit 42 performs second Gate Bootstrapping for a ciphertext output from the third operation unit 14.

The third Bootstrapping unit 43 performs third Gate Bootstrapping for a ciphertext output from the fourth operation unit 15.

The fourth Bootstrapping unit 44 performs fourth Gate Bootstrapping for a ciphertext output from the second Bootstrapping unit 42.

The first operation unit 12, the second operation unit 13, the third operation unit 14, the fourth operation unit 15, the fifth operation unit 16, and the sixth operation unit 17 are arithmetic processing units that implement homomorphic operations described below by software.

The first Bootstrapping unit 41, the second Bootstrapping unit 42, and the third Bootstrapping unit 43, and the fourth Bootstrapping unit 44 are arithmetic processing units that implement Gate Bootstrapping processes described below by software.

At least one of the first operation unit 12, the second operation unit 13, the third operation unit 14, the fourth operation unit 15, the fifth operation unit 16, the sixth operation unit 17, the first Bootstrapping unit 41, the second Bootstrapping unit 42, the third Bootstrapping unit 43, the fourth Bootstrapping unit 44, and the output unit 35 may be implemented by hardware.

The output unit 35 outputs a final operation result to outside of the encryption processing apparatus 1 or to another processing process executed by the encryption processing apparatus 1.

The storage unit 20 can store therein an input ciphertext, a temporary file and temporary data used in an operation for ciphertexts, and an output ciphertext.

An encrypted encryption database 60 can also be stored in the storage unit 20.

The communication unit 25 connects the encryption processing apparatus 1 to a network, thereby enabling communication between the encryption processing apparatus 1 and an external device to be performed.

The encryption processing apparatus 1 can serve as a database server by storing the encrypted encryption database 60 in the storage unit 20 and including the communication unit 25.

In this case, the encryption processing apparatus 1 can receive an encrypted query from a terminal device as the external device, search the encrypted encryption database 60, and send an encrypted search result to the terminal device.

The input unit 26 inputs a ciphertext that is an object of arithmetic processing and a query for the encrypted database 60, to the encryption processing apparatus 1.

FIG. 2 is a detailed explanatory diagram of an operation process based on Example 1 performed based on the functional configuration in FIG. 1.

The configuration illustrated in FIG. 2 uses Gate Bootstrapping presented in the aforementioned paper. Gate Bootstrapping in TFHE presented in the aforementioned paper will be described in detail below.

The encryption processing apparatus 1 performs comparison between Integer-wise type TLWE ciphertexts. A TLWE ciphertext ca is a ciphertext of a plaintext integer a, and a TLWE ciphertext cb is a ciphertext of a plaintext integer b.

In FIG. 2, the encryption processing apparatus 1 inputs the TLWE ciphertext ca to the first operation unit 12 and performs the first homomorphic operation to obtain a TLWE ciphertext ca'. The encryption processing apparatus 1 inputs the TLWE ciphertext ca' to the first Bootstrapping unit 41 and performs BlindRotate using a polynomial (X) as a test vector polynomial for the TLWE ciphertext ca' to obtain a TRLWE ciphertext r1.

The encryption processing apparatus 1 inputs the TRLWE ciphertext r1 to the second operation unit 13 and performs the second homomorphic operation to obtain a TRLWE ciphertext r1'.

The encryption processing apparatus 1 inputs the TLWE ciphertext ca and the TLWE ciphertext cb to the third operation unit 14 and performs the third homomorphic operation to obtain a TLWE ciphertext cc. The encryption processing apparatus 1 inputs the TLWE ciphertext cc to the second Bootstrapping unit 42 and performs BlindRotate using the TRLWE ciphertext r1', which is the result of the second homomorphic operation, as a test vector polynomial for the TLWE ciphertext cc to obtain a TRLWE ciphertext r2.

The encryption processing apparatus 1 performs Sample-Extract for the TRLWE ciphertext r2 by the second Bootstrapping unit 42 to obtain a TLWE ciphertext c3.

The encryption processing apparatus 1 performs Sample-Extract for the TRLWE ciphertext r1 by the first Bootstrapping unit 41 to obtain a new ciphertext c2.

The encryption processing apparatus 1 inputs the TLWE ciphertext c2 and the TLWE ciphertext c3 to the fourth operation unit 15 and performs the fourth homomorphic operation to obtain a TLWE ciphertext c4.

The encryption processing apparatus 1 inputs the TLWE ciphertext c4 to the third Bootstrapping unit 43 and performs BlindRotate using a polynomial F1'(X) as a test vector polynomial for the TLWE ciphertext c4 to obtain a TRLWE ciphertext r3.

The encryption processing apparatus 1 performs Sample-Extract twice for the TRLWE ciphertext r3 at two different portions and then performs the sixth homomorphic operation for the output of each SampleExtract by the fifth operation unit 16 to obtain TLWE ciphertexts c5 and c6.

Figure 3:
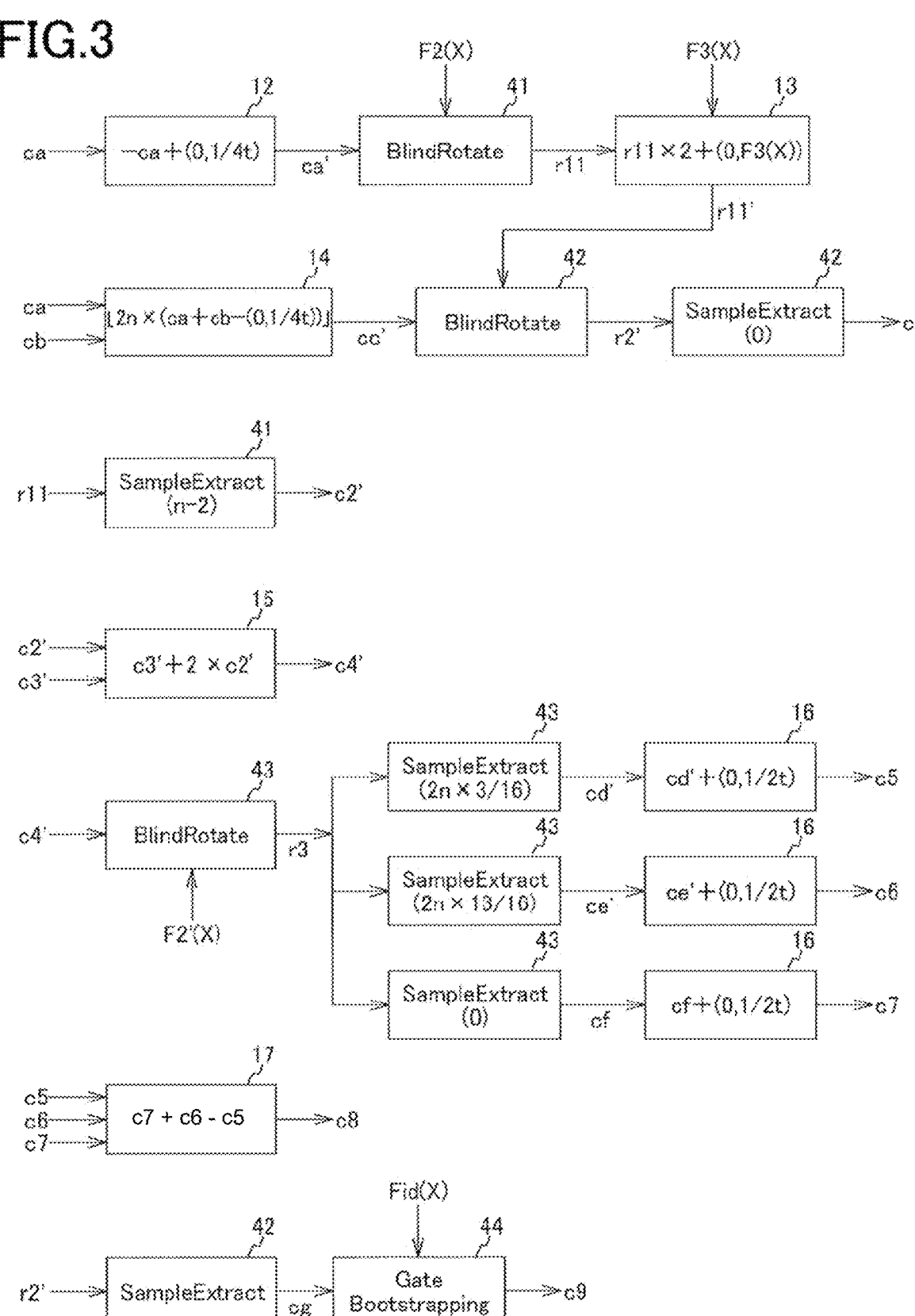
FIG. 3 is a detailed explanatory diagram of an operation process based on the functional configuration in FIG. 1.

FIG. 3 is an explanatory diagram of an operation process based on Example 2 performed based on the functional configuration in FIG. 1.

In FIG. 3, the encryption processing apparatus 1 inputs the TLWE ciphertext ca to the first operation unit 12 and performs the first homomorphic operation to obtain the TLWE ciphertext ca'. The encryption processing apparatus 1 inputs the new ciphertext ca' to the first Bootstrapping unit 41 and performs BlindRotate using a polynomial F2(X) as a test vector polynomial for the TLWE ciphertext ca' to obtain a TRLWE ciphertext r11.

The encryption processing apparatus 1 inputs the TRLWE ciphertext r11 to the second operation unit 13 and performs the second homomorphic operation to obtain a TRLWE ciphertext r11'.

The encryption processing apparatus 1 inputs the TLWE ciphertext ca and the TLWE ciphertext cb to the third operation unit 14 and performs the third homomorphic operation to obtain a TLWE ciphertext cc'.

The encryption processing apparatus 1 inputs the TLWE ciphertext cc' to the second Bootstrapping unit 42 and performs BlindRotate using the result of the second homomorphic operation r11' as a test vector polynomial for the TLWE ciphertext cc' to obtain a TRLWE ciphertext r2'.

The encryption processing apparatus 1 performs Sample-Extract for the TRLWE ciphertext r2' by the second Bootstrapping unit 42 to obtain a TLWE ciphertext c3'.

The encryption processing apparatus 1 performs Sample-Extract for the TRLWE ciphertext r11 by the first Bootstrapping unit 41 to obtain a new ciphertext c2'.

The encryption processing apparatus 1 inputs the TLWE ciphertext c2' and the TLWE ciphertext c3' to the fourth operation unit 15 and performs the fourth homomorphic operation to obtain a TLWE ciphertext c4'.

The encryption processing apparatus 1 inputs the TLWE ciphertext c4' to the third Bootstrapping unit 43 and performs BlindRotate using a polynomial F2'(X) as a test vector polynomial for the TLWE ciphertext c4' to obtain a TRLWE ciphertext r3.

The encryption processing apparatus 1 performs Sample-Extract three times for the TRLWE ciphertext r3 at different portions, inputs each output result to the fifth operation unit 16, and performs the fifth homomorphic operation to obtain the TLWE ciphertexts c5, c6, and c7.

The encryption processing apparatus 1 inputs the TLWE ciphertexts c5, c6, and c7 to the sixth operation unit 17 and performs the sixth homomorphic operation to obtain a TLWE ciphertext c8 corresponding to a comparison result.

The encryption processing apparatus 1 performs Sample-Extract for the TRLWE ciphertext r2' by the second Bootstrapping unit 42 to obtain a TLWE ciphertext cg.

The encryption processing apparatus 1 inputs the TLWE ciphertext cg to the fourth Bootstrapping unit 44 and performs Gate Bootstrapping using a polynomial $F_{id}(X)$ as a test vector polynomial for the TLWE ciphertext cg to obtain a TLWE ciphertext c9 corresponding to the result of an operation ca−cb.

Gate Bootstrapping explained in TFHE is described in detail.

Gate Bootstrapping is a method for making fully homomorphic encryption, which has not been practical because of a huge amount of data and its operation time, practical.

TFHE in the aforementioned paper uses encryption in which LWE (Learning with Errors) encryption is configured over a circle group, so called "TLWE encryption", and achieves various types of homomorphic logical operations (and furthermore any operation such as addition and multiplication) between TLWE ciphertexts at high speed with small data size while making an error in an operation small.

An input of Gate Bootstrapping in TFHE is a TLWE ciphertext encrypted with a private key.

TFHE achieves fully homomorphic encryption (FHE) based on TLWE ciphertexts.

TLWE encryption is a unique case of LWE encryption (obtained by defining LWE encryption over a circle group) that is one type of lattice-based cryptography.

TLWE encryption is additively homomorphic and is known as being able to perform an additive operation between plaintexts encrypted by TLWE encryption without decrypting ciphertexts.

Figure 4:
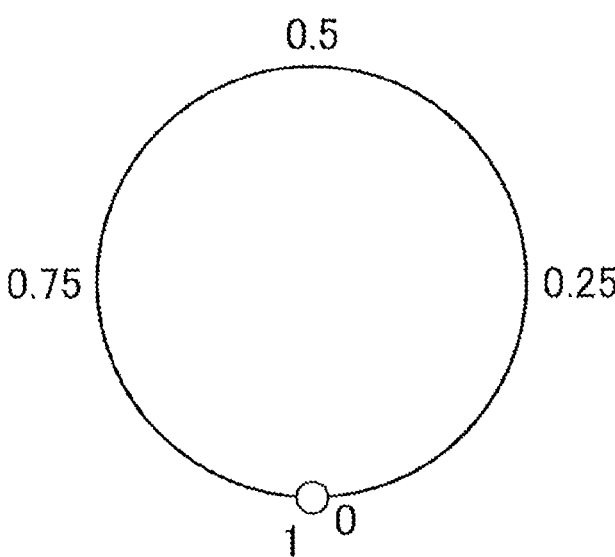
FIG. 4 is an image diagram for explaining a circle group that TLWE encryption has as a plaintext.

FIG. 4 is an image diagram for explaining a circle group that TLWE encryption has as a plaintext.

TLWE encryption has any point on a circle group {T} illustrated in FIG. 4, which moves from 0 to 1 with a real number precision and, when reaching 1, returns to 0, and uses a range near 0 (including an error) and a range near μ (including an error) as a plaintext.

The point on the circle group {T} is also described as an "element" in the present specification.

An encryption processing apparatus handling TFHE performs a generic homomorphic operation, for example, an additive operation as an operation between such TLWE ciphertexts, and makes an error of the operation result fall within an appropriate range by Gate Bootstrapping, thereby achieving fully homomorphic encryption (FHE) that allows a logical operation to be performed again (in the latter stage).

[TLWE Encryption]

TLWE encryption is described.

A vector [a] in which N random numbers uniformly distributed are arranged is prepared as an element on the circle group {T}. In addition, a private key vector [s] in which N values each being 0 or 1 are arranged at random is prepared.

Assuming that a random number in the Gaussian distribution (the normal distribution) in which an average value is a plaintext μ and a variance is preset to α is e, an example of a TLWE ciphertext is a pair ([a], [s]·[a]+e).

An average value of e when an infinite number of TLWE ciphertexts are created for the same plaintext μ is a plaintext μ, where μ is a plaintext without an error and e is a plaintext with an error.

Symbol "·" represents a dot product of vectors. This description is also applied to the following descriptions.

When [s]·[a]+e described above is written as b, the TLWE ciphertext can be represented as ([a], b).

A function $\varphi_s(([a], b))=b-[s]\cdot[a]=e$ is a function of decrypting the TLWE ciphertext. Since TLWE encryption adds a dot product of a private key vector and a random number vector and an error to a plaintext to encrypt the plaintext, TLWE encryption can be decrypted with the error by calculating the dot product of the private key vector and the random number vector. At this time, if the private key vector is unknown, a component serving as the dot product cannot be calculated, and therefore decryption cannot be performed.

This TLWE encryption is additively homomorphic and allows an additive operation between plaintexts of TLWE ciphertexts to be performed without decrypting the ciphertexts.

When ([a]+[a'], b+b') obtained by adding two TLWE ciphertexts ([a], b) and ([a'], b') together as they are is input to the aforementioned decryption function $\varphi_s$, a sum of the two plaintexts is obtained as represented by $\varphi_s(([a]+[a'], b+b'))=(b+b')-[s]\cdot([a]+[a'])=(b-[s]\cdot[a])+(b'-[s]\cdot[a'])=\varphi_s([a], b)+\varphi_s([a'], b')$. It is thus found that a TLWE ciphertext is a ciphertext obtained by "additive homomorphic encryption".

In TFHE in the aforementioned paper, various operations are achieved by repeating "performing an additive operation for TLWE ciphertexts each obtained by adding an error to a plaintext and reducing an error by Gate Bootstrapping".

In the following descriptions, a "trivial ciphertext" such as ([0], μ) is a TLWE ciphertext that can be decrypted with any private key, that is, a ciphertext that can be decrypted with any private key to provide the same plaintext.

In ([0], μ), [0] represents a zero vector.

Although the "trivial ciphertext" can be handled as a TLWE ciphertext, it can be considered as a state where a plaintext is placed in the ciphertext substantially as it is.

When the decryption function $\varphi_s$ is applied to the TLWE ciphertext ([0], μ), the private key [s] is multiplied by the zero vector [0] to disappear as represented by $\varphi_s(([0], μ))=μ-[s]\cdot0=μ$. The plaintext μ is thus obtained easily. Such a ciphertext is a trivial ciphertext with regard to the plaintext μ.

A finite cyclic group used in Gate Bootstrapping in TFHE is described.

Gate Bootstrapping uses the properties of a factor ring of a polynomial ring as a finite cyclic group.

The description is provided to explain that there is a finite cyclic group in a factor ring of a polynomial ring.

An n-th order polynomial is generally represented by $a_nX^n+a_{n-1}X^{n-1}+\ldots+a_0$.

These all sets form a commutative group for the sum f(x)+g(x) of polynomials.

Further, the product f(x)g(x) of polynomials has properties identical to those of the commutative group except that an inverse element is not necessarily present. Such a structure is called "monoid".

Regarding the sum and the product of polynomials, the distributive property is established as follows.

$$f(x)\{g(x)+g'(x)\}=f(x)g(x)+f(x)g'(x)$$

Therefore, when the sum and the product of polynomials are defined by regarding polynomials as elements, a "ring" is formed, which is called a polynomial ring.

TFHE uses a polynomial ring including the circle group {T} as coefficients, and such a polynomial ring is represented as T[X].

A polynomial T(X), which is a polynomial ring, is decomposed into $T[X](X^n+1)+T[X]$, and only the second term (the remainder) is extracted and collected. Then, a factor ring of a polynomial ring is obtained because the second term also has the properties of a "ring".

In TFHE, the factor ring of a polynomial ring is represented as $T[X]/(X^n+1)$.

A polynomial $F(X)=μX^{n-1}+μX^{n-2}+\ldots+μX+μ$ is extracted by using a desired coefficient μ (μ belongs to T) as an element of the factor ring of the polynomial ring $T[X]/(X^n+1)$.

When the element F(X) of the factor ring of the polynomial ring is multiplied by X, $μX^{n-1}+μX^{n-2}+\ldots+μX-μ$ is obtained, and the coefficient of the leading term appears as a constant term with the sign reversed from positive to negative. This is because only the highest order term can be divided into $\mu X^n = \mu(X^n+1) - \mu$ although the (n−2)th term and the lower terms cannot be divided by $X^n+1$ even after multiplication by X. Since the remainder of division by $X^n+1$ is considered, only $-\mu$ that is the remainder on the right side remains.

When multiplication by X is further performed, the same phenomenon happens again as represented by $\mu X^{n-1} + \mu X^{n-2} + \ldots + \mu X^2 - \mu X - \mu$ (the coefficient of the top term appears as a constant term with a sign reversed from positive to negative).

When this multiplication is repeated n times, $-\mu X^{n-1} - \mu X^{n-2} \ldots -\mu X - \mu$ is obtained, so that the coefficients of all terms become negative.

When multiplication by X is further continued, the coefficient of the top term becomes positive from negative and appears as a constant term as represented by $$-\mu X^{n-1} \mu X^{-2} \ldots -\mu X + \mu,$$

$$-\mu X^{n-1} \mu X^{-2} \ldots +\mu X + \mu.$$

When multiplication by X is repeated 2n times in total, the multiplication result returns to the original element of the factor ring of the polynomial ring $F(X) = \mu X^{n-1} + \mu X^{-2} + \ldots + \mu X + \mu$. As described above, the highest-order coefficient ($\mu$) appears as the lowest-order constant term with a reversed sign ($-\mu$), and terms are shifted by one in whole.

That is, the polynomial $F(X) = \mu X^{n-1} + \mu X^{n-2} + \ldots + \mu X + \mu$ is a finite cyclic group of order 2n in a ring that is the factor ring of the polynomial ring $T[X]/(X^n+1)$.

In TFHE, an encryption processing apparatus achieves fully homomorphic encryption by using such properties of the polynomial $F(X)$ based on a factor ring of a polynomial ring.

Regardless of whether the exponential part of X is positive or negative, when the element $F(X)$ of the factor ring of the polynomial ring is repeatedly multiplied by X n times, the signs of all the terms are reversed, and when this multiplication is repeated 2n times, the signs of all the terms return to the original signs.

Further, multiplication by $X^{-1}$ is an inverse operation of multiplication by X. Therefore, when multiplication by $X^{-1}$ is repeated, change opposite to that occurring when multiplication by X is performed. That is, when multiplication by $X^{-1}$ is performed n times, the signs of all the terms are reversed, and when this multiplication is performed 2n times, the signs of all the terms return to the original signs.

From the above facts, when the element $F(X)$ of the factor ring of the polynomial ring is repeatedly multiplied by X or $X^{-1}$ n times, the signs of all the terms are reversed, and when this multiplication is repeated 2n times, the signs of all the terms return to the original signs.

When attention is paid on the point that in this cyclic group, rotation can be done in both directions, the phrases of repeating multiplication −n times and repeating multiplication −2n times may be used, for the sake of convenience. This is merely a convenient representation for explaining the theory. When the present invention is put into practice, in a case where multiplication by $X^a$ is performed −b times, for example, multiplication by $X^{-a}$ may be performed b times or multiplication by $X^{2n-a}$ may be performed b times. Further, other modifications may be made, as long as the same result can be achieved consequently.

[TRLWE Encryption]

Gate Bootstrapping uses encryption called TRLWE encryption in addition to TLWE encryption.

TRLWE encryption is described.

The character R in TRLWE encryption means a ring, and TRLWE encryption is LWE encryption configured by a ring. TRLWE is also additive homomorphic encryption, as TLWE encryption is.

A ring in TRLWE encryption is the factor ring of the polynomial ring $T[X]/(X^{n+1})$ described above.

In order to obtain TRLWE encryption, elements of the factor ring of the polynomial ring $T[X]/(X^{n+1})$ are selected at random.

In fact, n coefficients in an (n−1)th order polynomial are selected as uniformly distributed random numbers from the circle group $\{T\}$.

When the order of the polynomial is n−1, the polynomial is not divided by $X^{n+1}$, and it is not necessary to consider a remainder. Therefore, it is assumed that the (n−1)th order polynomial is a polynomial a(X).

A polynomial s(X) serving as a private key described below is structured by selecting n values each being 0 or 1 at random.

$$s(X) = s_{n-1}X^{n-1} + s_{n-2}X^{n-2} + \ldots s_1 X + s_0$$

Assuming that n random numbers $e_i$ are random numbers in the Gaussian distribution (the normal distribution) in which an average value is a plaintext $\mu_i$ and a variance is $\alpha$, the following polynomial e(X) is structured from these random numbers.

$$e(X) = e_{n-1}X^{n-1} + e_{n-2}X^{n-2} + \ldots e_1 X + e_0$$

Decomposition of $s(X) \cdot a(X) + e(X)$ is performed into $f(X)(X^n+1) + b(X)$, and b(X) is obtained.

Consequently, (a(X), b(X)) is obtained as a TRLWE ciphertext.

In TRLWE encryption, encryption is performed using random numbers similarly to TLWE encryption, and therefore innumerable ciphertexts can correspond to the same private key and the same plaintext.

In addition, in TRLWE encryption, g(X) determined in such a manner that $\varphi_s$ becomes an element of $T[X]/(X^n+1)$ serves as a decryption function, where $\varphi_s((a(X), b(X)) = b(X) - s(X) \cdot a(X) + g(X)(X^n+1)$, as in TLWE encryption. In other words, $(b(X) - s(X) \cdot a(X)) \bmod (X^n+1)$ serves as a decryption function, where mod is a remainder of division.

[Gadget Decomposition]

Gadget Decomposition is described.

A coefficient in a polynomial used in a TRLWE ciphertext is a real number that is an element of the circle group $\{T\}$ in FIG. 4 and is equal to or larger than 0 and less than 1, and only has a fractional part.

An operation of decomposing this coefficient into several bits in binary notation is defined as Gadget Decomposition (Dec) in TFHE in the aforementioned paper.

For example, assuming that the degree n of the polynomial $F(X)$ of a TRLWE ciphertext is 2, one unit of decomposition is $Bg = 2^2$, and decomposition into 1=3 elements is performed. At this time, each element is arranged to enter between $-Bg/2$ and $Bg/2$.

A TRLWE ciphertext is a combination of two polynomials like (a(X), b(X)) as described above. Therefore, a TRLWE ciphertext d can be written as $$d = [0.75X^2 + 0.125X + 0.5, 0.25X^2 + 0.5X + 0.375]$$

by being regarded as a two-dimensional vector having polynomials that serve as elements of a factor ring of a polynomial ring, as elements. Accordingly, in the following descriptions, each element is decomposed into the form of a sum of powers of $Bg^{-1} = 0.25$.

Since $0.75=-0.25$ is established on the circle group $\{T\}$, decomposition can be performed as follows.

$$d = [0.75X^2 + 0.125X + 0.5, 0.25X^2 + 0.5X + 0.375]$$

$$= [-0.25X^2 + 0.125X + 0.5, 0.25X^2 + 0.5X + 0.25 + 0.125]$$

$$= [0.25 \times (-X^2 + 2) + 0.25^2 \times 2X + 0.25^3 \times 0, 0.25 \times$$

$$(X^2 + 2X + 1) + 0.25X^2 \times 2 + 0.25^3 \times 0]$$

Therefore, when Gadget Decomposition is performed, a vector $$Dec(d) = [-X^2 + 2, 2X, 0, X^2 + 2X + 1, 2, 0]$$

is obtained.

An operator H of inverse transform from a vector to a ciphertext is also defined.

When the description is provided based on the example described above, a matrix $$H = \begin{pmatrix} 0.25 & 0 \\ 0.25^2 & 0 \\ 0.25^3 & 0 \\ 0 & 0.25 \\ 0 & 0.25^2 \\ 0 & 0.25^3 \end{pmatrix}$$

becomes the operator H of the inverse transform. A TRLWE ciphertext d is obtained by performing an operation Dec(d) ·H. The lower bits are rounded off.

It can also be said that an operation of obtaining [v] that makes $\|d-[v]\cdot H\|$ minimum with respect to the TRLWE ciphertext d is Gadget Decomposition. Here, $\|$ is a vector norm (length).

21 TRLWE ciphertexts $Z_i = (a(X), b(X))$ are generated by calculation using a polynomial in which all coefficients of $e(X)$ are generated by random numbers having an average value of 0 and a variance of $\alpha$.

The plaintext $\mu$ is encrypted in the following manner, whereby the following ciphertext k is obtained.

$$k = \begin{pmatrix} Z_1 \\ Z_2 \\ \vdots \\ Z_{2\ell} \end{pmatrix} + \mu \times H$$

A ciphertext that can be represented by this ciphertext k is rereferred to as "TRGSW ciphertext".

The TRGSW ciphertext configures a Bootstrapping Key used below.

The Bootstrapping Key is described.

The Bootstrapping Key is used as a method of encrypting a private key in order to use the private key in Gate Bootstrapping.

Separately from the private key [s] (Nth order) used for TLWE ciphertexts, each element of a private key [s'] for encrypting the private key [s] is selected to be either of two values, i.e., 0 or 1 for use in Gate Bootstrapping.

It is necessary to make the order of the private key [s'] the same as the order n of polynomials used in TRLWE encryption.

A TRGSW ciphertext is created for each element in the private key [s].

When decryption with the private key [s'] is performed, 21 TRLWE ciphertexts $Z_j$ are created where $\varphi_{s'}(Z_j)=0$ is satisfied.

$BK_i$ is then represented by $$BK_i = \begin{pmatrix} Z_1 \\ Z_2 \\ \vdots \\ Z_{2\ell} \end{pmatrix} + s_i \cdot H$$

as in the above-described configuration of the TRGSW ciphertext.

This TRGSW ciphertext is prepared by using different $Z_j$ for each element in the private key [s]. A set of the TRGSW ciphertexts thus prepared is referred to as "Bootstrapping Key (BK)". That is, the BK is a set of N TRGSW ciphertexts.

The cross product of the TRGSW ciphertext $BK_i$ and the TRLWE ciphertext d is defined as follows.

$$BK_i \times d = Dec(d) \cdot BK_i$$

Gadget Decomposition is an operation of obtaining [v] that makes $\|d-[v]\cdot H\|$ minimum with respect to the TRLWE ciphertext d.

Therefore, by using [v]=Dec(d) and an error $(\varepsilon_a(X), \varepsilon_b(X))$, $[v]\cdot H = d + (\varepsilon_a(X), \varepsilon_b(X))$ can be written.

As a result, $BK_i \times d - Dec(d) \cdot BK_i$ $$= \vec{v} \cdot \begin{pmatrix} Z_1 \\ Z_2 \\ \vdots \\ Z_{2\ell} \end{pmatrix} + s_i \times \vec{v} \cdot H$$

is obtained.

When the left side calculates the dot product, and $[v]\cdot H = d + (\varepsilon_a(X), \varepsilon_b(X))$ is substituted into the right side, $$= \sum_{j=1}^{2\ell} v_j \times Z_j + s_i \times (d + (\epsilon_0(X), \epsilon_b(X)))$$

$$= \sum_{j=1}^{2\ell} v_j \times Z_j + s_i \times d + s_i \times (\epsilon_a(X), \epsilon_b(X))$$

is obtained, and becomes the same as calculation of the sum of the following three ciphertexts c1, c2, and c3.

$$c_1 = \sum_{j=1}^{2\ell} v_j \times Z_j$$

$$c_2 = s_i \times d$$

$$c_3 = s_i \times (\epsilon_a(X), \epsilon_b(X))$$

Since TRLWE encryption is additive homomorphic encryption, calculating the sum of ciphertexts is the same as calculating the sum of plaintexts.

Since $c_1$ is obtained by adding several times of $Z_j$, expected values of respective coefficients in the plaintext $\varphi_{s'}(c_1)$ are all 0.

In addition, $\varphi_{s'}(c_3)$ obtained by decryption is set to be sufficiently small also in the subsequent operations, because the magnitude of an absolute value of each coefficient in the plaintext can be adjusted by a system parameter.

In this case, $\varphi_{s'}(BK_i \times d) = \varphi_{s'}(s_i \times d)$ is obtained, but the calculation result is the sum of the above three ciphertexts c1, c2, and c3 regardless of whether $s_i$ is 0 or 1. Whether $s_i$ is 0 or 1 cannot be determined by a simple comparison.

Assuming that there are TRLWE ciphertexts $d_0$ and $d_1$ respectively corresponding to two plaintext polynomials $\mu_0$ and $\mu_1$, when $d_1-d_0$ is substituted for d, and $d_0$ is finally added, the following CMux function is completed.

$$\text{CMux}(BK_i,d_0,d_1)=BK_i\times(d_1-d_0)+d_0=$$
$$\text{Dec}(d_1-d_0)\cdot BK_i+d_0$$

The CMux function outputs a TRLWE ciphertext whose plaintext polynomial is $\mu_0$ without decrypting it when $s_i$ is 0, and outputs a TRLWE ciphertext whose plaintext polynomial is $\mu_1$ without decrypting it when $s_i$ is 1.

Although the CMux function can calculate the TRLWE ciphertext whose plaintext polynomial is $\mu_0$ or $\mu_1$, it is not known from the calculation result which one is selected, without decryption of the TRLWE ciphertext.

Binary Gate Bootstrapping in TFHE is performed using various information described above.

Binary Gate Bootstrapping is configured by three steps described below, i.e., (1) BlindRotate, (2) SampleExtract, and (3) Public Key Switching.

Figure 5:
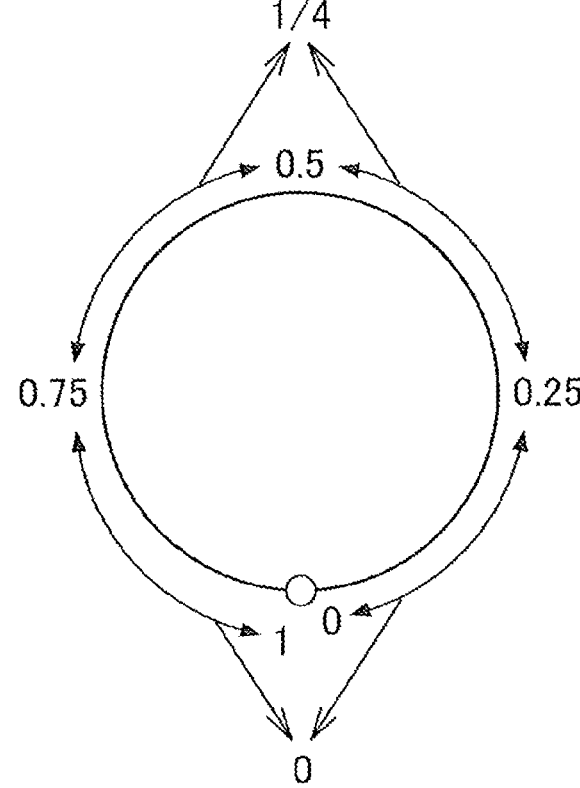
FIG. 5 is an operation image diagram of binary Gate Bootstrapping.

FIG. 5 is an operation image diagram of binary Gate Bootstrapping.

Binary Gate Bootstrapping reduces an error for a plaintext included in a result of a homomorphic operation between TLWE ciphertexts by three steps descried below.

In the following descriptions, unless otherwise specified, a plaintext means a result of an operation between plaintexts obtained as a result of an operation between TLWE ciphertexts.

A plaintext in the section from 0 to 0.25 ($\frac{1}{4}$) or 0.75 ($\frac{3}{4}$) to 1 on the circle group {T} in FIG. 4 is converted to a TLWE ciphertext of 0, and a plaintext in the section from 0.25 ($\frac{1}{4}$) to 0.75 ($\frac{3}{4}$) is converted to a ciphertext of 0.25 ($\frac{1}{4}$).

An error added to the plaintext in this conversion is any error in a range of $\pm\frac{1}{16}$.

(1) BlindRotate

BlindRotate is performed as the first step of Gate Bootstrapping.

BlindRotate is a process of creating a TRLWE ciphertext.

In BlindRotate, from a trivial TRLWE ciphertext (0, T(X)) whose plaintext is a polynomial T(X), a TRLWE ciphertext multiplied by $X^{-\varphi s(c')}$ is obtained without decryption. "0" indicates a 0th degree polynomial 0.

Here, $\varphi s(c')$ is a plaintext obtained by applying a decryption function to the following LWE ciphertext c'.

In BlindRotate, the following polynomial T(X)

$$T(X)=F(X)\cdot X^{n/2}$$

is prepared, which is obtained by multiplying the following polynomial F(X)

$$F(X)=\mu X^{n-1}+\mu X^{n-2}+\ldots \mu X+\mu$$

where $\mu=\frac{1}{8}$,
that forms the above-described finite cyclic group and serves as a test vector, by $X^{n/2}$.

It is assumed that there is a TLWE ciphertext c obtained by encrypting the plaintext $\mu 1$ with the private key [s].

Each element of this TLWE ciphertext c=([a], b) is multiplied by 2n and is then rounded off, whereby a LWE ciphertext c'=([a'], b') is obtained.

When the LWE ciphertext c'=([a'], b') is decrypted, $\mu 1'=\varphi_s(c')\approx 2n\times\varphi_s(c)=2n\mu 1$ is obtained. While both sides are not always coincident with each other because of a rounding error, the error becomes smaller relatively as n becomes larger.

A trivial TRLWE ciphertext (0, T(X)) whose plaintext is the polynomial T(X) is prepared, and it is assumed that $A_0=X^{-b'}\times(0, T(X))=(0, X^{-b'}\times T(X))$, where 0 indicates a 0th order polynomial 0. Since b' is an integer, exponentiation can be defined naturally. Actually, it suffices to cause a coefficient of each term of a polynomial of the TRLWE ciphertext to cycle by a predetermined number.

Subsequently, $A_i=\text{CMux}(BK_i, A_{i-1}, X^{a'i}A_{i-1})$ is calculated in turn by using $BK_i$ that is the Bootstrapping Key described above. Since a'i is an integer also in this expression, a power of X can be defined naturally. Similarly, it suffices to cause a coefficient of each term of a polynomial that is an element of a TRLWE ciphertext $A_{i-1}$ to cycle by a predetermined number, instead of calculating the power of X.

Accordingly, the plaintext is not changed when $s_i$ is 0, and multiplication by $X^{a'i}$ is performed in turn when $s_i$ is 1.

Therefore when calculation is repeated as represented by $$\phi'_s(A_0) = X^{-b'}T(X)$$

$$\phi'_s(A_1) = X^{s_1 a'_1-b'}T(X)$$

$$\phi'_s(A_2) = X^{s_2 a'_2+s_1 a'_1-b'}T(X)$$

then $$\phi'_s(A_n) = X^{\sum_{i=1}^N s_i\times a'_i-b'}T(X)$$

is obtained.
Here, $$\sum_{i=1}^N s_i\times a'_i - b'$$

is equal to the decryption function $\varphi s(c')$ with the sign reversed. Therefore, $$\phi_s'(A_n)=X^{-\phi s(c')}T(X)$$

is obtained. Here, $\varphi_s'(A_n)$ is a ciphertext of a polynomial obtained by multiplying the polynomial T(X) by $X^{-1}$ $\mu 1'$ times and $A_n$ is its ciphertext.

It should be noted that at this time, the error component of the plaintext e with error of the first set TLWE ciphertext c appears as the amount of rotation of the polynomial T(X) but does not appear as the magnitude of the coefficient value of each term. In TFHE, the error is essentially reduced by this mechanism.

Furthermore, in association with the plaintext $\mu 1$ of the TLWE ciphertext c related to BlindRotate, unique values (up to 2n values including n coefficients and n values obtained by reversing the signs of the n coefficients) depending on the number of times $\mu 1'(=2n\mu 1)$ of multiplication of the polynomial T(X) by X are obtained as coefficients of constant terms of a plaintext polynomial. These values can be regarded as a kind of lookup table.

(2) SampleExtract

In the plaintext polynomial $\varphi_s(A_n)$ obtained by decrypting the TRLWE ciphertext $A_n$ obtained by BlindRotate in (1), $n/2-\varphi_s(c')$ terms from the lowest term have a coefficient of $-\mu$. When $\varphi_s(A_n)$ is negative, coefficients are $-\mu$ from the highest term in turn conversely.

When attention is paid only to a constant term of the plaintext polynomial $\varphi_s(A_n)$ obtained by decrypting the TRLWE ciphertext $A_n$, the constant term is $\mu$ if $\varphi_s(c')$ is equal to or greater than n/2 and less than 3n/2, that is, $\varphi_s(c)$ is $\frac{1}{2}\pm\frac{1}{4}$. Otherwise, i.e., if $\varphi_s(c)$ is $\pm\frac{1}{4}$, the constant term is $-\mu$.

SampleExtract is a process for extracting only the coefficient of the constant term of the plaintext polynomial $\varphi_s(A_n)$ from the TRLWE ciphertext $A_n$ obtained by BlindRotate in (1) without decrypting the TRLWE ciphertext $A_n$, thereby obtaining a TLWE ciphertext cs.

As described above, the error added to the TLWE ciphertext c as the first input and the rounding error only affect the position of the boundary at which the plaintext and the plaintext of the constant term is switched between $\mu$ and $-\mu$. The influence on the magnitude of the coefficient of the constant term is negligibly small. That is, it can be interpreted that an input error is removed. Further, the width within which the boundary at which the value of the plaintext of the constant term is switched can be shifted without causing any problem is the error limit within which a Bootstrapping process can be performed correctly, and serves as a mechanism of causing a trade-off described later.

The process for obtaining the TLWE ciphertext cs is described.

All TRLWE ciphertexts can be expressed as $(A(X), B(X))$ by putting polynomials as $$A(X) = \sum_{i=1}^{n} a_i X^{i-1}$$
$$B(X) = \sum_{i=1}^{n} b_i X^{i-1}$$

where n is the order.

When decryption with the private key [s'] is performed, the expression can be expanded by putting a polynomial of the private key as $$S'(X) = \sum_{i=1}^{n} s'_j X^{j-1}$$

Then, $$\phi'_s(c) = B(X) - S'(X) \cdot A(X) = \sum_{i=1}^{n} b_i X^{i-1} - \sum_{i=1}^{n} \sum_{j=1}^{n} a_i s'_j X^{(i+j-2)}$$

is obtained.

The following operation is then performed with regard to this expression.

$$\sum_{i=1}^{n} b_i X^{i-1} - \sum_{i=1}^{n} \sum_{j=1}^{n} a_i s'_j X^{(i+j-2)} = \sum_{i=1}^{n} b_i X^{i-1} -$$
$$\sum_{i=1}^{n} \sum_{j=i-1}^{n+i-2} a_i s'_{j-i+2} X^j$$
$$= \sum_{i=1}^{n} b_i X^{i-1} -$$
$$\sum_{i=1}^{n} \sum_{j=i-1}^{n-1} a_i s'_{j-i+2} X^j -$$
$$\sum_{i=1}^{n} \sum_{j=n}^{n+i-2} a_i s'_{j-i+2} X^j$$
$$= \sum_{j=1}^{n} b_j X^{j-1} -$$
$$\sum_{j=0}^{n-1} \sum_{i=1}^{j+1} a_i s'_{j-i+2} X^j -$$
$$\sum_{j=n}^{2n-2} \sum_{i=j-n+2}^{n} a_i s'_{j-i+2} X^j$$

-continued
$$= \sum_{j=0}^{n-1} b_{j+1} X^j -$$
$$\sum_{j=0}^{n-1} \sum_{i=0}^{j} a_{i+1} s'_{j-i+1} X^j -$$
$$\sum_{j=0}^{n-2} \sum_{i=j-n+1}^{-1} a_{i+n+1} s'_{j-i+1} X^{j+n}$$
$$= \sum_{j=0}^{n-2} b_{j+1} X^j + b_n X^{n-1} -$$
$$\sum_{j=0}^{n-2} \sum_{i=0}^{j} a_{i+1} s'_{j-i+1} X^j -$$
$$\sum_{i=0}^{n-1} a_{i+1} s'_{n-i} X^{n-1} -$$
$$\sum_{j=0}^{n-2} \sum_{i=j-n+1}^{-1} a_{i+n+1} s'_{j-i+1} X^{j+n}$$
$$= \sum_{j=0}^{n-2} \left( b_{j+1} X^j - \sum_{i=0}^{j} a_{i+1} s'_{j-i+1} X^j - \sum_{i=j-n+1}^{-1} a_{i+n+1} s'_{j-i+1} X^{j+n} \right) +$$
$$b_N X^{n-1} - \sum_{i=0}^{n-1} a_{i+1} s'_{n-i} X^{n-1}$$

Since this is "a factor ring of a polynomial ring", the remainder when this is divided by $(X^n+1)$ is calculated. Then, $$\sum_{j=0}^{n-2} \left( b_{j+1} X^j - \sum_{i=0}^{j} a_{i+1} s'_{j \ldots i+1} X^j + \sum_{i=j-n+1}^{-1} a_{i+n+1} s'_{j \ldots i+1} X^j \right) +$$
$$b_N X^{n-1} - \sum_{i=0}^{n-1} a_{i+1} s'_{n-i} X^{n-1} =$$
$$\sum_{j=0}^{n-2} \left( b_{j+1} - \sum_{i=0}^{j} a_{i+1} s'_{j-i+1} + \sum_{i=j-n+1}^{-1} \alpha_{i+n+1} s'_{j-i+1} \right) X^j +$$
$$\left( b_n - \sum_{i=0}^{n-1} a_{i+1} s'_{n-i} \right) X^{n-1}$$

is obtained.

Further, when $$a'_i = \begin{cases} a_i & (i \geq 1) \\ -a_{i+n} & (\text{otherwise}) \end{cases}$$

is put, then $$= \sum_{j=0}^{n-2} \left( b_{j+1} - \sum_{i=0}^{j} a'_{i+1} s'_{j-i+1} - \sum_{i=j-n+1}^{-1} a'_{i+1} s'_{j-i+1} \right) X^j + \left( b_N - \sum_{i=0}^{n-1} a'_{i+1} s'_{n-i} \right) X^{n-1}$$
$$= \sum_{j=0}^{n-2} \left( b_{j+1} - \sum_{i=j-n+1}^{j} a'_{i+1} s'_{j-i+1} \right) X^j + \left( b_N - \sum_{i=0}^{n-1} a_{i+1} s'_{n-i} \right) X^{n-1}$$
$$= \sum_{j=0}^{n-2} \left( b_{j+1} - \sum_{i=0}^{n-1} a'_{i+j-n+2} s'_{n-i} \right) X^j + \left( b_n - \sum_{i=0}^{n-1} a_{i+1} s'_{n-i} \right) X^{n-1}$$
$$= \sum_{j=0}^{n-1} \left( b_{j+1} - \sum_{i=0}^{n-1} a'_{i+j-n+2} s'_{n-i} \right) X^j$$

is obtained, and coefficients of respective terms of a plaintext polynomial are obtained from $$\phi'_s(c) = \sum_{j=0}^{n-1} \left( b_{j+1} - \sum_{i=0}^{n-1} a'_{i+j-n+2} s'_{n-i} \right) X^j.$$

Among the obtained coefficients, a coefficient of a constant term is necessary. Therefore, when a coefficient for j=0 is extracted, $$b_1 - \sum_{i=0}^{n-1} a'_{i-n+2} s'_{n-i}$$

is obtained. When $$a''_i = a'_{-i+2}$$

is put, the extracted coefficient can be deformed into a decryption function of TLWE encryption as represented by $$b_1 - \sum_{i=0}^{n-1} a''_{n-i} s'_{n-i} = b_1 - \sum_{i=0}^{n-1} a''_i s'_i = b_1 - \vec{s'} \cdot \vec{a''} = \phi'_s(\vec{a''}, b_1).$$

That is, when coefficients are extracted from the TRLWE ciphertext $A_n = (A(X), B(X))$ obtained by BlindRotate in (1) while the coefficients are set as $$a''_i = \begin{cases} a_1 & (i = 1) \\ -a_{-i+n+2} & (\text{otherwise}) \end{cases},$$

a new TLWE ciphertext ([a"], $b_1$) is obtained which has, as a plaintext, the same value as a constant term of a plaintext polynomial corresponding to the original TRLWE ciphertext $A_n$. This new TLWE ciphertext is the output of SampleExtract and has either of two types of plaintexts, i.e., $-\mu$ or $\mu$.

A trivial ciphertext ([0], $\mu$) of which the plaintext is $\mu$ is added to the thus obtained TLWE ciphertext, thereby obtaining a TLWE ciphertext cs=([a"], b1)+([0], $\mu$).

Specifically, since $\mu = \frac{1}{8}$ in the polynomial F(X) as a test vector, a ciphertext of $-\frac{1}{8}$ or $\frac{1}{8}$ is obtained in this stage.

When the trivial TLWE ciphertext ([0], $\frac{1}{8}$) of which the plaintext is $\mu = \frac{1}{8}$ is added to this ciphertext, $$-\frac{1}{8} + \frac{1}{8} = 0$$

$$\frac{1}{8} + \frac{1}{8} = \frac{1}{4}$$

are established, and thus a new TLWE ciphertext cs having either of two values, i.e., 0 or $\frac{1}{4}$ as the plaintext is obtained.

(3) Public Key Switching

The TLWE ciphertext cs obtained in SampleExtract in (2) is encrypted with the private key [s'], not with the private key [s].

Therefore, it is necessary to replace the key of the TLWE ciphertext cs with the private key [s] and return the state of the ciphertext to a state where encryption has been performed with the private key [s], without decrypting the TLWE ciphertext cs.

Therefore, a method of Public Key Switching is described.

The private key [s] for a TLWE ciphertext used in TFHE is an N-th order vector.

By using this vector, the private key [s'] that is an n-th order vector when the Bootstrapping Key has been created is encrypted.

That is, the private key [s'] is encrypted as a value obtained by shifting an element of the circle group {T} to each digit of a real number from 0 to 1 in binary notation, as represented by $$s'_i \times 2^{-1} s'_i \times 2^{-2} s'_i \times 2^{-3} \ldots$$

The private key is [s]. The "number of digits" t is a system parameter.

When decryption is performed with the private key [s], $$\phi_s(KS_{i,j}) = s'_i \times 2^{-j}$$

is obtained. This is a "key switching key".

As described above, the TLWE ciphertext cs=([a], b) obtained in (2) is 0 or $\frac{1}{4}$ obtained by encryption with the private key [s']. The number of elements of [a] is the same as that of the private key [s'] and is n.

When the elements are converted to t-bit fixed-point numbers by one each, the t-bit fixed point numbers can be written in the following form.

$$a_i \approx \sum_{j=1}^{t} a_{i,j} \times 2^{-j}.$$

Although an error is increased in this stage, the maximum value of the absolute value can be limited by a system parameter.

As main processing of Public Key Switching, the following TLWE ciphertext cx is calculated.

$$cx = (\vec{0}, b) - \sum_{i=i}^{n} \sum_{j=1}^{t} a_{i,j} \times KS_{i,j}$$

Since the term ([0], b) is a trivial ciphertext, this term is b when being decrypted. A result of decryption of the TLWE ciphertext cx is as follows.

$$\phi_s(cx) = b - \sum_{i=1}^{n} \sum_{j=1}^{t} a_{i,j} \times s'_i \times 2^{-j} = b - \sum_{i=1}^{n} \sum_{j=1}^{t} s'_i \times a_{i,j} \times 2^{-j}$$

Since $s'_i$ is a constant for j, it is factored out as follows.

$$= b - \sum_{i=1}^{n} s'_i \sum_{j=1}^{t} a_{i,j} \times 2^{-j}$$

The expression obtained in decomposition into the fixed-point numbers is then substituted.

$$\approx b - \sum_{i=1}^{n} s'_i \times a_i = \phi'_s((\vec{a}, b)) = \phi'_s(c_s)$$

As a result, $$\phi_s(cx) \approx \phi_s(c_s)$$

is obtained, and key switching is successful.

The TLWE ciphertext cx obtained here is encrypted with the private key [s] that is the same as the private key for the TLWE ciphertext c used as the input of Gate Bootstrapping.

By performing the processing of Public Key Switching, the ciphertext returns to the TLWE ciphertext encrypted with the private key [s], so that its plaintext $\varphi_s(cx)$ is 0 when $\varphi_s(c)$ is in a range of $\pm\frac{1}{4}$, and is $\frac{1}{4}$ when $\varphi_s(c)$ is in a range of $\frac{1}{2} \pm \frac{1}{4}$.

With the processing described above, a TLWE ciphertext is obtained as a result of Gate Bootstrapping, which is either of two values, i.e., 0 or $\frac{1}{4}$ and has any error within $\pm\frac{1}{16}$.

The maximum value of the error does not depend on the TLWE ciphertext c that is the input, and is a value fixed by a system parameter.

Therefore, the system parameter is set in such a manner that the maximum value of the error is any value within $\pm\frac{1}{16}$ that is the same range as that for a TLWE ciphertext as the input.

This setting enables a NAND operation to be performed any number of times. The NAND operation is an operation having completeness by itself in the field of logical operations. That is, if only the NAND operation can be realized, all logical operations can be performed by the combination thereof. Therefore, by representing any numerical value in binary, all operations including addition and multiplication can be performed.

Examples of an error added to the "plaintext" of a TLWE ciphertext output from Gate Bootstrapping include an error added by rounding-off of a TLWE ciphertext, an error added by CMux, and an error when the TLWE ciphertext is converted to a fixed-point number in Public Key Switching. All these errors can be limited by a system parameter, and the system parameter can be adjusted in such a manner that an error for which all things are considered falls within $\pm\frac{1}{16}$.

The processing described above is processing of Gate Bootstrapping in TFHE.

As described above, TFHE is Bit-wise type homomorphic encryption that has zero or non-zero as the plaintext and enables a logical operation to be performed. However, the plaintext is a real number from 0 to 1 associated with the circle group $\{T\}$, as described with reference to FIG. 4. Therefore, by associating sections obtained by dividing the circle group $\{T\}$ with integers in turn, TFHE can be applied as Integer-wise type homomorphic encryption having an integer as the plaintext.

Figure 6:
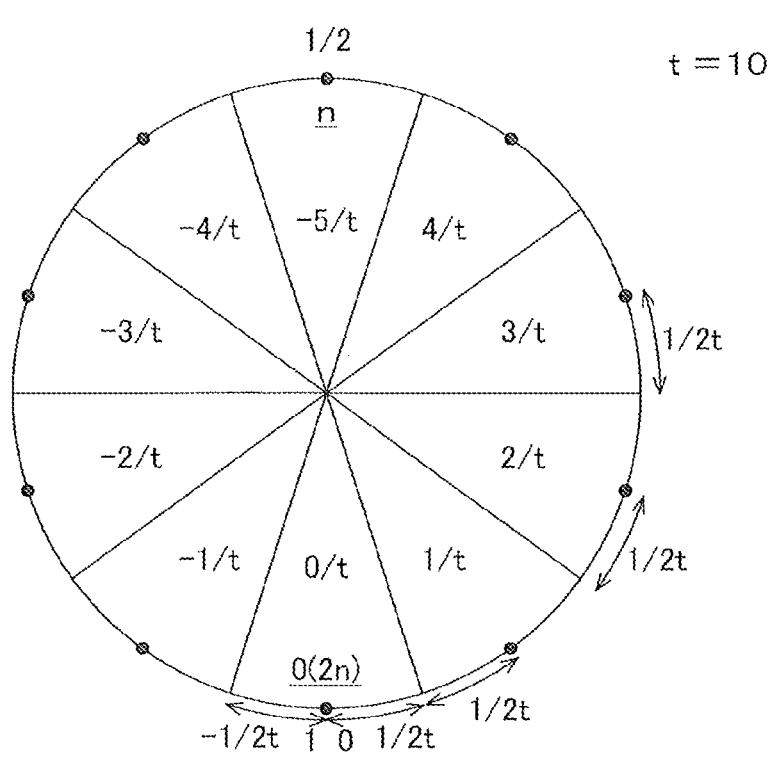
FIG. 6 is an explanatory diagram of TFHE applied to an Integer-wise type.

FIG. 6 is an explanatory diagram of THE applied to the Integer-wise type.

As illustrated in FIG. 6, the range from 0 to 1 associated with the circle group $\{T\}$ is divided into t. For a TLWE ciphertext, possible values of a plaintext are t values obtained by dividing the range from 0 to 1, i.e., from $-(t/2)$ to $(t/2)-1$, and $(t/2)-1$ is the maximum value of the integer that can be stored in one TLWE ciphertext.

As exemplified in FIG. 6, assuming that t is set to 10 and the range from 0 to 1 is divided into 10, a ciphertext can represent integers of $-5$, $-4$, $-3$, $-2$, $-1$, 0, 1, 2, 3, and 4. These integer values are assigned to sections centered on $-5/t$, $-4/t$, $-3/t$, $-2/t$, $-1/t$, $0/t$, $1/t$, $2/t$, $3/t$, and $4/t$ that are obtained by dividing the range from 0 to 1 of the circle group $\{T\}$ into $t=10$, respectively. By this assignment, integers can be successively assigned counterclockwise from the region that is centered on $\frac{1}{2}$ and is the minimum value when being represented by integer, as illustrated in FIG. 6.

As illustrated in FIG. 6, 0 (1) on the circle group $\{T\}$ is within the range of the region from $-1/(2t)$ to $1/(2t)$. As for a plaintext of a ciphertext on the circle group $\{T\}$, the position in the region (the position on the circle group $\{T\}$) can be adjusted by adding or subtracting an offset based on, for example, $1/(2t)$ to/from the state in FIG. 6, as necessary.

In the embodiment described below, the meaning of the division number t of the circle group is different from that in the description of FIG. 6, although it is essentially unchanged.

Figure 7A:
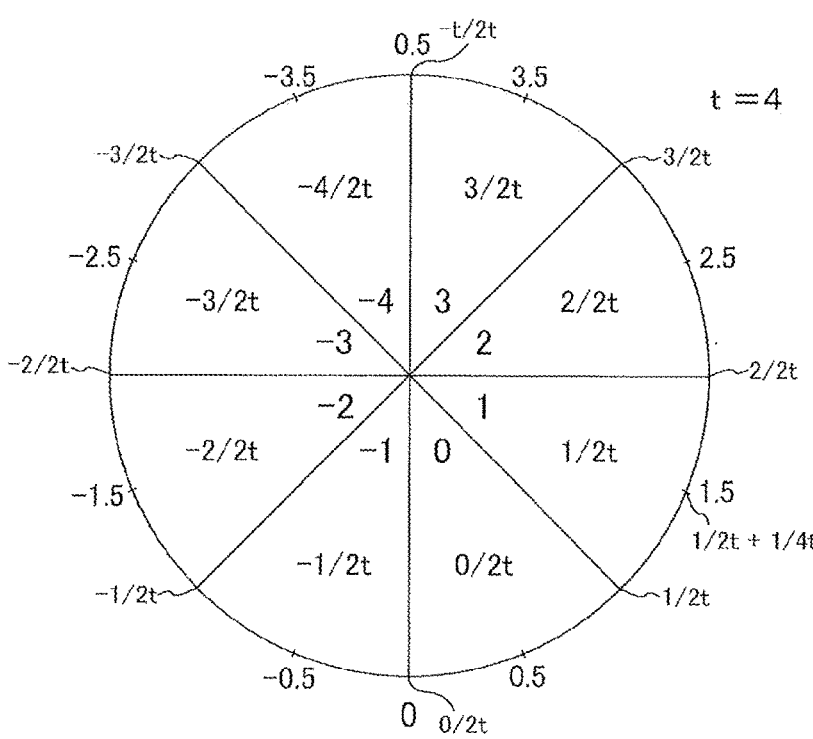
FIGS. 7A and 7B are explanatory diagrams of Integer-wise type TFHE in the present embodiment.
Figure 7B:
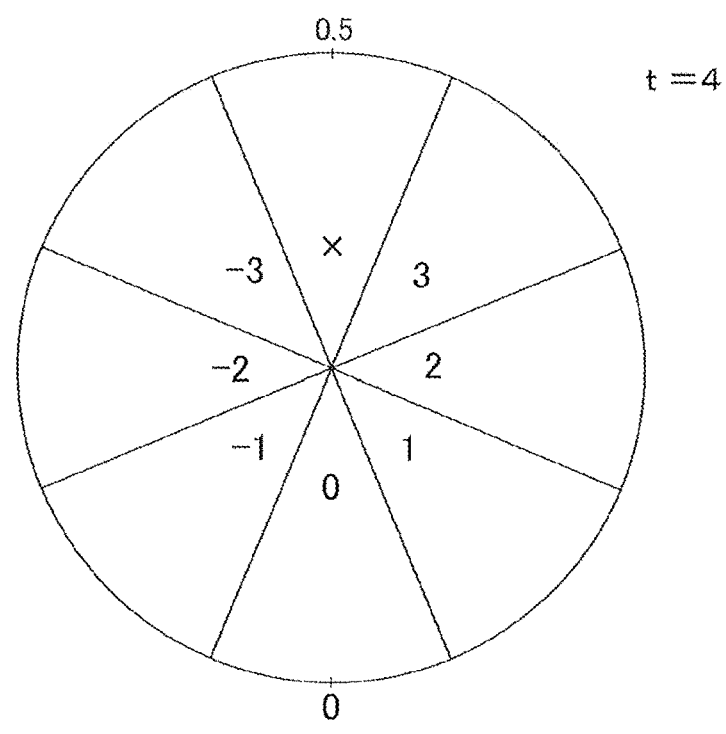

FIGS. 7A and 7B are explanatory diagrams of Integer-wise type TFHE in the present embodiment.

As illustrated in FIGS. 7A and 7B, a ciphertext according to the present embodiment divides the entire range (0 to 1) of the circle group $\{T\}$ into 2t.

The range of integer values that can be recorded in a TLWE ciphertext can be made larger by making the value of t larger and dividing the circle group $\{T\}$ more finely. However, when the circle group is divided too finely, there is a problem that the range of an error to be added to a plaintext becomes too small, thus lowering the strength of encryption. This point will be described later.

An integer value is assigned to every section with a width of $1/(2t)$ obtained by dividing the circle group $\{T\}$, and possible plaintext integers of a TLWE ciphertext are from $-t$ to $t-1$, where $t-1$ is the maximum integer value that can be recorded in one TLWE ciphertext, and $-t$ is the minimum integer value that can be recorded in one TLWE ciphertext.

As in the case of FIG. 6, a state where no offset is added to a plaintext (the offset added to the plaintext is 0) is illustrated in FIG. 7B. FIG. 7A illustrates a state where an offset of, for example, $+1/(4t)$ is added to the plaintext of the ciphertext illustrated in FIG. 7B. By adding the offset, the manner of slicing the circle group $\{T\}$ can be changed.

In the following descriptions, it is assumed that the right half plane and the left half plane of the circle group are based on the state in FIG. 7A where the offset of only $1/(4t)$ is added.

In a case where the circle group is represented as 0 to 1, for example, the right half plane is from 0 to 0.5, and the left half plane is from 0.5 to 1. Similarly, in a case where the circle group is represented as $-0.5$ to 0.5, the left half plane is from $-0.5$ to 0, and the right half plane is from 0 to 0.5. These representations are different from each other in how the coordinate on the circle group is represented, but are not essentially different.

In addition, addition and subtraction on the circle group have directions. In the present embodiment, it is assumed that the counterclockwise direction is a positive (plus) direction, and the clockwise direction is a negative (minus) direction. That is, the result of addition of 0.25 to an element on the circle group means an element on a point shifted from the original element by a $\frac{1}{4}$ turn in the counterclockwise direction. The same applies to a case of subtraction. This assumption is for illustration together with the concept of the left half plane and the right half plane described above, and in practice, exactly the same discussion applies regardless of which is the positive direction.

In the state where no offset is added illustrated in FIG. 7B, 0 (1) on the circle group $\{T\}$ is within the slice from $-1/(4t)$ to $1/(4t)$ (one slice corresponds to noise added to a plaintext around 0).

By adding the offset, the integer 0 can be associated with the slice $(0/(2t))$ starting from 0 on the circle group $\{T\}$, as illustrated in FIG. 7A. Another slice starts from $X/(2t)$ (where X is a plaintext integer). Since 0 on the circle group $\{T\}$ is associated to refer to the 0th order term in a test vector polynomial used in a process that uses bootstrapping, adding the offset in the above-described manner has an advantage that the order of coefficients becomes natural and easy to see.

In FIG. 7A, the plaintext with the offset added is located at the center of each slice (for example, the slice starting from $3/(2t)$) with an error in a range of $\pm1/(4t)$. At this time, the average of the normal distribution is, for example, $3/(2t)+1/(4t)$, and plaintexts are distributed within the error range of $\pm1/(4t)$ in most cases. The plaintexts are thus distributed at the center of the slice starting from $3/(2t)$.

Although the plaintext with the offset added is illustrated only in the slice of $3/(2t)$ in FIG. 7A, this illustration is merely an example. A plaintext with the offset added to a value serving as a starting point is present in every slice. This description also applies to FIG. 8.

The ciphertext in FIG. 7A divides the right half plane of the circle group {T} into t and the left half plane into t. The right half plane of the circle group {T} corresponds to 0 and positive plaintext integers (0 to t–1), and the left half plane corresponds to negative plaintext integers (–1 to –t). The width of one block (slice) is 1/(2t).

Integer values are respectively assigned to the slices obtained by dividing the range from 0 to 1 (–½ to ½) of the circle group {T} into 2t and respectively starting from –t/(2t) to (t–1)/(2t).

Non-negative integers are assigned to slices starting from 0/(2t), 1/(2t), . . . , (t–3)/(2t), (t–2)/2t, and (t–1)/(2t) of the right half plane, respectively. Negative integers are assigned to slices starting from –t/(2t), –(t–1)/(2t), –(t–2)/(2t), . . . , –1/(2t) of the left half plane, respectively.

These slices are each centered at a value obtained by adding the offset of +1/(4t) to the value serving as the starting point. The offset of 1/(4t) corresponds to half of the slice width of 1/(2t). When the offset of ¼t is included in integer representation, it can be represented as an offset of +0.5 for convenience.

As illustrated in FIG. 7A, in a case where 2t=8 (t=4) is established and the range of the circle group is divided into eight, integers from 0 to 3 (=t–1) can be represented by the right half plane of the circle group {T}, and integers from –4 (=–t) to –1 can be represented by the left half plane. That is, the entire ciphertext can represent integers of –4, –3, –2, –1, 0, 1, 2, and 3.

These integer values are assigned to sections obtained by dividing the range of the circle group {T} into 2t=8 and starting from –4/(2t), –3/(2t), –2/(2t), –1/(2t), 0/(2t), 1/(2t), 2/(2t), and 3/(2t), respectively. Integers are successively assigned counterclockwise from the region starting from ½.

Considering the above-described offset of 0.5, the slice starting from 1/(2t) on the right half plane, for example, is the slice centered on 1.5/(2t), and the slice starting from –4/(2t) on the left half plane, for example, is the slice centered on –3.5/(2t). Integers represented to include the offset are –3.5, –2.5, –1.5, –0.5, 0.5, 1.5, 2.5, and 3.5 counterclockwise from top.

The encryption processing apparatus 1 sets a system parameter in TFHE. At this time, the encryption processing apparatus 1 sets the system parameter in such a manner that the range of an error added to a plaintext is less than ±1/(4t) in a ciphertext obtained after Gate Bootstrapping.

It is assumed that there are a TLWE ciphertext ca and a TLWE ciphertext cb that are to be added.

The TLWE ciphertexts ca and cb are TLWE ciphertexts having the configuration illustrated in FIG. 7A, and each divide the right half plane into t and the entire circle group {T} into 2t.

In the present embodiment, as for each of the TLWE ciphertext ca and the TLWE ciphertext cb, the right half plane of the circle group {T} is associated with a plaintext that is a non-negative integer, and the left half plane is associated with a plaintext that is a negative integer.

The TLWE ciphertext ca has a real number a/(2t)+1/(4t) corresponding to the integer a that cannot be known without a private key, as its plaintext.

The TLWE ciphertext cb has a real number b/(2t)+1/(4t) corresponding to the integer b that cannot be known without a private key, as its plaintext.

These are plaintexts without an error, and a value with an error in the above-described range added thereto is stored as each plaintext actually.

The fact that the plaintexts of the TLWE ciphertexts ca and cb are a/(2t) and b/(2t), respectively, is based on that the entire circle group is divided into 2t. As described above, the offset of +1/(4t) added to the plaintext associates the slice starting from 0 on the circle group with integer 0 and also locates the plaintext at the center of the slice.

As described for FIG. 7A, the offset is also added to the plaintext in each of the TLWE ciphertext ca and the TLWE ciphertext cb, as represented by a/(2t)+1/(4t) or b/(2t)+1/(4t).

The value of the offset, 1/(4t), is merely an example, and is not limited thereto. In accordance with the offset value, it is necessary to adjust a polynomial and parameters.

In FIG. 7A, the left half plane of the circle group {T}, which handles negative integers, represents integers from –t to –1 by using slices from the slice starting from –t/(2t) to the slice starting from –1/(2t) counterclockwise from top.

The right half plane of the circle group {T}, which handles 0 and positive integers (non-negative integers), represents integers from 0 to t–1 by using slices from the slice starting from 0/(2t) to the slice starting from (t–1)/(2t) counterclockwise from bottom.

The present embodiment relates to an operation of comparison between ciphertexts using Integer-wise type TFHE.

In a case of implementing an operation of comparison between unencrypted integers by a CPU, a comparison instruction may actually be subtraction that discards the result. This is because, when a subtraction instruction is executed, a flag register is changed depending on the result. If a flag among flags indicating the subtraction result, which indicates that the operation result is 0, is set, it is found that two values are equal to each other in the previous subtraction. By looking a flag such as overflow and carry, it is possible to find which one of the values that have been compared is larger.

In a case of performing a similar comparison in the Integer-wise type TFHE, a possible method is to perform homomorphic subtraction between two TLWE ciphertexts and make determination based on where the plaintext of a TLWE ciphertext as an operation result is located on the circle group {T}. It is considered that by using an appropriate LUT after the homomorphic subtraction, a value corresponding to a flag register can be obtained.

In a case of using only the right half plane (e.g., 0 to 0.5) on the circle group {T}, that is, handling non-negative integers only, if the plaintext of the result of the homomorphic subtraction ca–cb between the ciphertexts is in the section of the right half plane on the circle group {T}, no borrow occurs, and φ(ca)≥φ(cb).

To the contrary, if the plaintext of the result of the homomorphic subtraction ca–cb is in the section of the left half plane (e.g., from 0.5 to 1.0) on the circle group {T}, the subtraction result is negative, and φ(ca)<φ(cb).

A case of a comparison operation used for a carry can be considered in a similar manner. As a result of homomorphic addition between TLWE ciphertexts each configuring one division unit of a multiple precision integer, if the plaintext of the result of the homomorphic addition ca+cb is in the section of the right half plane on the circle group {T}, no carry occurs.

To the contrary, if the plaintext of the result of the homomorphic addition ca+cb is in the section of the left half plane on the circle group, a carry occurs.

However, use of the entire circle group (e.g., from 0 to 1.0) for using the circle group without waste has the following problem.

It is assumed that, in a case where the entire circle group is divided into 2t slices and the slices are respectively associated with integers from 0 to 2t–1, the plaintext of the result of the homomorphic addition ca+cb between cipher-texts is 3 in integer representation. Only from this result, it cannot be determined whether, in homomorphic addition between ciphertexts, 3 is obtained without a carry as a result of calculation of 0+3 or is obtained as a result of addition between t+1 and t+2 and occurrence of a carry in the sum 2t+3 of this addition.

In a case where the entire circle group {T} (e.g., from 0 to 1.0) is associated with integers from −t to t−1, more complicated consideration is necessary because the associated integers include negative integers.

It is assumed that the plaintext of the result of the homomorphic addition ca+cb between ciphertexts is −2 in integer representation. Only from this result, it cannot be determined whether, in homomorphic addition between ciphertexts, −2 is obtained without a borrow as a result of calculation of 0+(−2) or is obtained as a result of calculation of (t−1)+(t−1) and occurrence of a carry in the calculation result 2t−2.

Further, in a case of (−t)+(−t), the result of addition becomes −2t, and a borrow occurs in spite of addition.

Therefore, in a case where the entire circle group {T} is associated with integers, there are three possibilities that a carry occurs, a borrow occurs, neither carry nor borrow occurs.

For this reason, it is necessary to perform an appropriate process for all the patterns when multiple precision addition or multiple precision subtraction is performed.

An operation of comparison between ciphertexts using Integer-wise type TFHE is described below.

Although the following description refers to a case of performing homomorphic addition ca+cb corresponding to the plaintext a+b, homomorphic subtraction corresponding to the plaintext a−b can be performed in an identical manner by reversing the value (sign) of the plaintext b of the TLWE ciphertext cb in advance.

Information indicating a carry or a borrow in the homomorphic addition ca+cb corresponding to the plaintext a+b can be used as the result of an operation of comparing the plaintext a and the plaintext b, that is, the ciphertext ca and the ciphertext cb with each other.

The encryption processing apparatus 1 in the present embodiment performs addition of a trivial ciphertext of a plaintext polynomial to a TRLWE ciphertext that is the output of BlindRotate, and then performs BlindRotate again, thereby obtaining a ciphertext corresponding to the presence or absence of a carry or a borrow as the result of the comparison operation.

Examples 1 and 2 described below explain comparison between TLWE ciphertexts each configuring one division unit of multiple precision arithmetic.

Example 1

The description is provided with reference to FIG. 2.

First, the encryption processing apparatus 1 inputs the TLWE ciphertext ca, which has been input and received, to the first operation unit 12 and performs a homomorphic operation of adding a trivial ciphertext (0, 1/(4t)) having 1/(4t) as the plaintext to a TLWE ciphertext −ca obtained by reversing the sign of the TLWE ciphertext ca in a homomorphic manner, thereby obtaining the new ciphertext ca' corresponding to −ca+(0, 1/(4t)).

The encryption processing apparatus 1 inputs the TLWE ciphertext ca' to the first Bootstrapping unit 41 and performs BlindRotate for the ciphertext ca' by using the polynomial $$F1(X)$$

$$F1(X) = \sum_{i=0}^{n-1} \frac{1}{16} X^i$$

in which all coefficients are $1/16$ as a test vector polynomial, thereby obtaining the TRLWE ciphertext r1.

Subsequently, the encryption processing apparatus 1 inputs the TRLWE ciphertext r1 to the second operation unit 13 and subtracts a trivial ciphertext (0, F1(X)) having the polynomial F1(X) as the plaintext from the TRLWE ciphertext r1 in a homomorphic manner to obtain the new TRLWE ciphertext r1' corresponding to r1×2-(0, F1(X)).

The encryption processing apparatus 1 inputs the TLWE ciphertext ca and the TLWE ciphertext cb to the third operation unit 14, adds the TLWE ciphertext ca and the TLWE ciphertext cb together in a homomorphic manner, and subtracts a trivial ciphertext (0, 1/(4t)) in a homomorphic manner, thereby obtaining the new TLWE ciphertext cc corresponding to ca+c−(0, 1/(4t)). The reason for subtracting the trivial ciphertext (0, 1/(4t)) is that a constant term is necessary for deleting an offset of each of the TLWE ciphertext ca and the TLWE ciphertext cb, the offset corresponding to 0.5 (1/(4t) on the circle group {T}) when seen in integer precision.

The encryption processing apparatus 1 inputs the TLWE ciphertext cc to the second Bootstrapping unit 42 and performs BlindRotate for the TLWE ciphertext cc by using the TRLWE ciphertext r1' as a test vector polynomial to obtain the TRLWE ciphertext r2. Further, the encryption processing apparatus 1 performs SampleExtract for the TRLWE ciphertext r2 at the position of 0, thereby extracting the coefficient of the 0th order term (a constant term) and obtaining the ciphertext c3.

In some cases, it is not necessary to perform a homomorphic operation between the TLWE ciphertext ca and the TLWE ciphertext cb by the third operation unit 14, and it suffices to use the TLWE ciphertext cc having the same plaintext as the TLWE ciphertext ca. In this case, BlindRotate by the second Bootstrapping unit 42 for the TLWE ciphertext cc can be regarded as BlindRotate for the TLWE ciphertext ca.

FIGS. 8 to 12 are explanatory diagrams of a ciphertext representing the result of addition between ciphertexts.

In the present embodiment, it is assumed that the range of the circle group {T} is 0 to 1, non-negative integers are assigned to the right half plane, and negative integers are assigned to the left half plane, where the boundary between the right half plane and the left half plane is set at 0.5 (½). In the following description, the section of the right half plane of the circle group {T} is from 0 to 0.5, and the section of the left half plane is from 0.5 to 1.

The range of the circle group {T} may not be from 0 to 1 but may be from −0.25 to 0.75 or −0.5 to 0.5.

Figure 8:
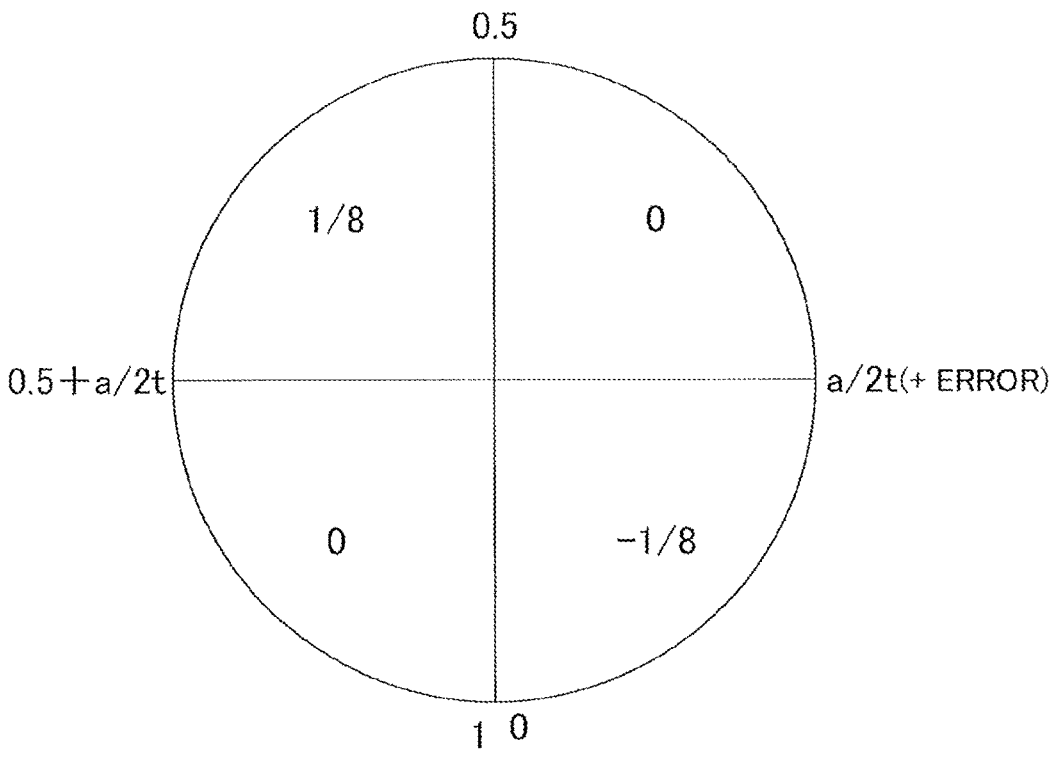
FIG. 8 is an explanatory diagram of a ciphertext representing the result of addition between ciphertexts.

FIG. 8 illustrates what is obtained as the plaintext of the above-described TLWE ciphertext c3 for which value of the plaintext a+b, in a case where the plaintext a of the TLWE ciphertext ca is an integer and non-negative (a≥0).

In the case where the plaintext a (the value on the circle group {T} is a/(2t)) of the TLWE ciphertext ca is an integer and non-negative, the plaintext a is in the section of the right half plane of the circle group {T}, as illustrated in FIG. 8.

A carry occurs in a case where the plaintext a+b of the ciphertext ca+cb obtained by homomorphic addition of the ciphertext cb to the TLWE ciphertext ca on the circle group {T} crosses 0.5 on the circle group {T} counterclockwise to become a large value on the left half plane. In that case, the plaintext $\varphi(c3)$ of the TLWE ciphertext c3 is $\frac{1}{8}$, as illustrated in FIG. 8.

If the plaintext a is on the right half plane of the circle group {T}, $\varphi(ca+cb)$, that is, the plaintext a+b does not cross the boundary of 0.5+a/(2t) both clockwise and counterclockwise. This is because the plaintext a+b always falls within the range of ±0.5 with respect to a/(2t) as a reference. Therefore, even if the value of the plaintext b is large when a carry occurs, the plaintext $\varphi(c3)$ of the TLWE ciphertext c3 does not become 0.

Figure 9:
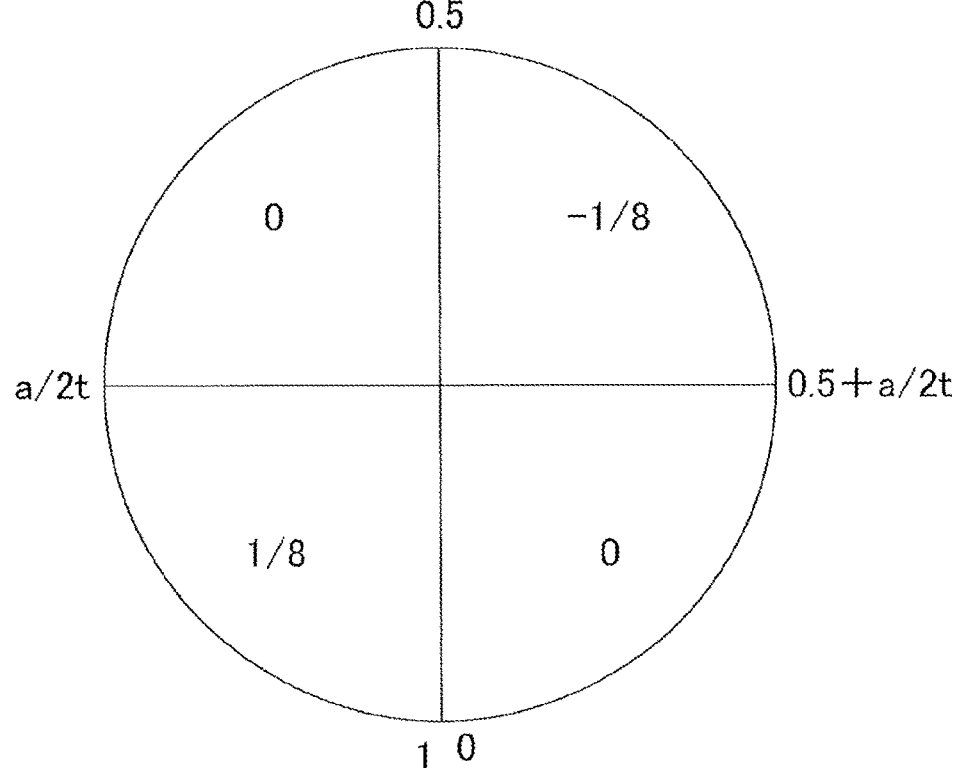
FIG. 9 is an explanatory diagram of a ciphertext representing the result of addition between ciphertexts.

FIG. 9 illustrates what is obtained as the plaintext of the above-described TLWE ciphertext c3 for which value of the plaintext a+b, in a case where the plaintext a of the TLWE ciphertext ca is an integer and negative (a<0).

In the case where the plaintext a (the value on the circle group {T} is a/(2t)) of the TLWE ciphertext ca is an integer and negative, the plaintext a is in the section of the left half plane of the circle group {T}, as illustrated in FIG. 9.

A borrow occurs in a case where the plaintext a+b of the ciphertext ca+cb obtained by homomorphic addition of the TLWE ciphertext cb to the TLWE ciphertext ca on the circle group {T} crosses 0.5 on the circle group {T} clockwise to become a small value on the right half plane. In that case, the plaintext $\varphi(c3)$ of the TLWE ciphertext c3 is $-\frac{1}{8}$, as illustrated in FIG. 9.

If the plaintext a is in the section of the left half plane of the circle group {T}, $\varphi(ca+cb)$, that is, the plaintext a+b does not cross the boundary of 0.5+a/(2t) both clockwise and counterclockwise. This is because the plaintext a+b always falls within the range of ±0.5 with respect to a/(2t) as a reference. Therefore, even if the value of the plaintext b is small when a borrow occurs, the plaintext $\varphi(c3)$ of the TLWE ciphertext c3 does not become 0.

Summarizing FIGS. 8 and 9, the plaintext $\varphi(c3)$ of the TLWE ciphertext c3 is any of 0 and ±$\frac{1}{8}$.

In a case where the plaintext a is in the section of the right half plane of the circle group {T} and a+b is carried up, the plaintext $\varphi(c3)$ of the TLWE ciphertext c3 is $\frac{1}{8}$. In a case where no carry occurs, the plaintext $\varphi(c3)$ of the TLWE ciphertext c3 is 0 or $-\frac{1}{8}$.

Meanwhile, in a case where the plaintext a is in the section of the left half plane of the circle group {T} and a+b is carried down, the plaintext $\varphi(c3)$ of the TLWE ciphertext c3 is $-\frac{1}{8}$. In a case where no borrow occurs, the plaintext $\varphi(c3)$ of the TLWE ciphertext c3 is 0 or $\frac{1}{8}$.

That is, in a case where the plaintext $\varphi(c3)$ of the TLWE ciphertext c3 is 0, a+b is not carried up or down. However, in a case where the plaintext (c3) is $-\frac{1}{8}$ or $\frac{1}{8}$, the presence or absence of a carry and a borrow changes depending on whether the plaintext a is negative.

However, the value of the plaintext a cannot be known without decrypting the TLWE ciphertext ca. Therefore, only from the TLWE ciphertext c3, it is not possible to identify whether the plaintext a is in the section of the right half plane of the circle group {T} or in the section of the left half plane of the circle group {T}, that is, a+b is carried up or down.

Therefore, a ciphertext is required which indicates whether the plaintext a is in the section of the right half plane of the circle group {T} or in the section of the left half plane of the circle group {T}.

Referring back to FIG. 2, the encryption processing apparatus 1 inputs the TRLWE ciphertext r1 to the first Bootstrapping unit 41 and performs SampleExtract for the TRLWE ciphertext r1 at the position of n−1 on the circle group {T} (the (n−1)th order term, that is, the highest-order term), thereby obtaining the TLWE ciphertext c2.

Since the TLWE ciphertext c2 is extracted from the TRLWE ciphertext r1 obtained by BlindRotate performed for −ca by using the above F1(X) in which the coefficients of all the terms are $\frac{1}{16}$, it is a ciphertext obtained by rotating the above polynomial F1(X) by −a to the lower-order direction. In other words, the TLWE ciphertext c2 has rotated the above polynomial F1(X) by a to the higher-order direction.

In a case where the plaintext integer a≥0 is satisfied, that is, the plaintext $\varphi(ca)$ of the TLWE ciphertext ca is in the section of the right half plane of the circle group, $\frac{1}{16}$ that is the coefficients in F1(X) becomes the plaintext of the TLWE ciphertext c2 as it is.

In a case where the plaintext integer a<0 is satisfied, that is, the plaintext $\varphi(ca)$ is in the section of the left half plane of the circle group, $-\frac{1}{16}$ obtained by reversing the sign of $\frac{1}{16}$ that is the coefficients in F1(X) becomes the plaintext of the TLWE ciphertext c2.

This TLWE ciphertext c2 is a ciphertext that has, as the plaintext, information indicating whether the plaintext a of the TLWE ciphertext ca is in the section of the right half plane of the circle group {T} or in the section of the left half plane of the circle group {T}.

The encryption processing apparatus 1 inputs the TLWE ciphertexts c2 and c3 to the fourth operation unit 15 and calculates c3+2×c2 to obtain the TLWE ciphertext c4. This operation can be executed by homomorphic multiplication by a scalar and homomorphic addition that are usually performed.

In a case where the plaintext a of the TLWE ciphertext ca is in the section of the left half plane of the circle group {T}, the plaintext of the TLWE ciphertext c2 is $-\frac{1}{16}$, and the plaintext of the TLWE ciphertext c3 is any of $-\frac{1}{8}$, 0, and $\frac{1}{8}$. Therefore, the plaintext of the TLWE ciphertext c4 is obtained by adding $(-\frac{1}{16})\times2=-\frac{1}{8}$ to the plaintext of the ciphertext c3 and is any of 0, $-\frac{1}{8}$, and $-\frac{1}{4}$. In the TLWE ciphertext c4, the value of the plaintext of the TLWE ciphertext c3 is shifted by $\frac{1}{8}$ to the negative side on the circle group {T}. Therefore, only in a case where the plaintext a is in the section of the left half plane of the circle group {T} and a borrow occurs, $\varphi(c4)$ of the TLWE ciphertext c4 becomes $-\frac{1}{4}$.

In a case where the plaintext a is in the section of the right half plane of the circle group {T}, the plaintext of the TLWE ciphertext c2 is $\frac{1}{16}$, and the plaintext of the TLWE ciphertext c3 is any of $-\frac{1}{8}$, 0, and $\frac{1}{8}$. Therefore, the plaintext of the TLWE ciphertext c4 is obtained by adding $(\frac{1}{16})\times2=\frac{1}{8}$ to the plaintext of the ciphertext c3 and is any of 0, $\frac{1}{8}$, and $\frac{1}{4}$. In the TLWE ciphertext c4, the value of the plaintext of the TLWE ciphertext c3 is shifted by $\frac{1}{8}$ to the positive side on the circle group {T}. Therefore, only in a case where the plaintext a is in the section of the right half plane of the circle group {T} and a carry occurs, $\varphi(c4)$ becomes $\frac{1}{4}$.

Neither carry nor borrow occurs in a case where the plaintext a is in the section of the right half plane of the circle group {T} and is 0 as an integer; no carry occurs in a case where the plaintext a is in the section of the left half plane of the circle group {T}; and no borrow occurs in a case where the plaintext a is in the section of the right half plane of the circle group {T}.

Therefore, if the plaintext $\varphi(c4)$ of the TLWE ciphertext c4 is $\frac{1}{4}$, a carry occurs, and if the plaintext $\varphi(c4)$ of the TLWE ciphertext c4 is $-\frac{1}{4}$, a borrow occurs.

The TLWE ciphertext c4 is a ciphertext that makes it possible to determine the presence or absence of a carry and the presence or absence of a borrow based on the value of its plaintext $\varphi(c4)$.

That is, only based on the TLWE ciphertext c4, it is possible to determine whether a carry occurs, a borrow occurs, or neither carry nor borrow occurs as a result of homomorphic addition ca+cb.

The encryption processing apparatus 1 inputs the TLWE ciphertext c4 to the third Bootstrapping unit 43 and performs BlindRotate for the TLWE ciphertext c4 by using the following polynomial F1'(X) as a test vector polynomial to obtain the TRLWE ciphertext r3.

$$F1'(X) = \sum_{i=0}^{n-1} \frac{1}{4t} X^i$$

The encryption processing apparatus 1 performs Sample-Extract for the TRLWE ciphertext r3 at a plurality of portions (two portions including $2n \times \frac{5}{16}$ and $2n \times \frac{3}{16}$) on the circle group {T} to extract TLWE ciphertexts cd and ce. The encryption processing apparatus 1 then adds a trivial ciphertext (0, 1/(2t)) having 1/(2t) as the plaintext to the ciphertexts cd and ce in a homomorphic manner.

The ciphertext obtained by adding (0, 1/(2t)) to the TLWE ciphertext cd extracted by SampleExtract at the position of $2n \times \frac{5}{16}$ is the TLWE ciphertext c5.

The ciphertext obtained by adding (0, 1/(2t)) to the TLWE ciphertext ce extracted by SampleExtract at the position of $2n \times \frac{3}{16}$ is the TLWE ciphertext c6.

The encryption processing apparatus 1 performs both comparison with ¼ (the presence or absence of a carry) and comparison with −¼ (the presence or absence of a borrow) simultaneously to obtain the TLWE ciphertext c5 and the TLWE ciphertext c6.

The TLWE ciphertext c5 is a ciphertext for which its plaintext φ(c5) is 1/(4t) (0 as an integer) in a case where a carry occurs (the plaintext of the TLWE ciphertext c4 is ¼) and is 1/(2t)+1/(4t) (1 as an integer) in a case where no carry occurs (the plaintext of the TLWE ciphertext c4 is −¼) and is 1/(2t)+1/(4t).

The ciphertext c6 is a ciphertext for which its plaintext φ(c6) is 1/(4t) (0 as an integer) in a case where a borrow occurs and is 1/(2t)+1/(4t) (1 as an integer) in a case where no borrow occurs.

As a result of the above processes, the TLWE ciphertext c5 indicating the presence or absence of a carry in binary and the TLWE ciphertext c6 indicating the presence or absence of a borrow in binary are obtained.

These ciphertexts can be converted to any ciphertexts that can take two values suitable for application by changing the coefficients in the polynomial F1'(X) used for BlindRotate, adjusting the plaintext of a trivial ciphertext as an offset for the ciphertext after SampleExtract, and performing an additional operation for the TLWE ciphertext c5 and the TLWE ciphertext c6.

In a case of simply comparing two ciphertexts, i.e., the TLWE ciphertext ca and the TLWE ciphertext cb, the above-described operation is performed for the TLWE ciphertext ca and the TLWE ciphertext cb for which the sign of the plaintext b is reversed to −b, whereby it can be determined which one of the TLWE ciphertext ca and the TLWE ciphertext cb is larger.

Example 2

Next, a case is considered as Example 2 with reference to FIG. 3, in which a ciphertext having information as a carry flag or a borrow flag and a ciphertext corresponding to the plaintext a+b itself (the result of addition or subtraction) are obtained at the same time. This case is considered as being applicable to multiple precision arithmetic.

Example 2 is different from Example 1 only in a constant used.

Homomorphic addition ca+cb is performed in Example 1, and this addition can be used as it is. However, in order to perform a plurality of operations, error reduction has to be performed in the middle by, for example, performing Bootstrapping using a stepped polynomial.

In a case of using the entire circle group, however, a negative value cannot be returned to the original value when Bootstrapping is performed by a stepped polynomial simply. Therefore, it is necessary to perform Bootstrapping twice by the polynomial $F_{id}$.

Bootstrapping performed twice includes Bootstrapping (first time), described below, inverting the order of values on the left half plane on the circle group {T} which handles negative values and Bootstrapping (second time) returning the left half plane for which the order of values is inverted to the original state.

Bootstrapping by the polynomial $F_{id}$ is described.

Figure 10:
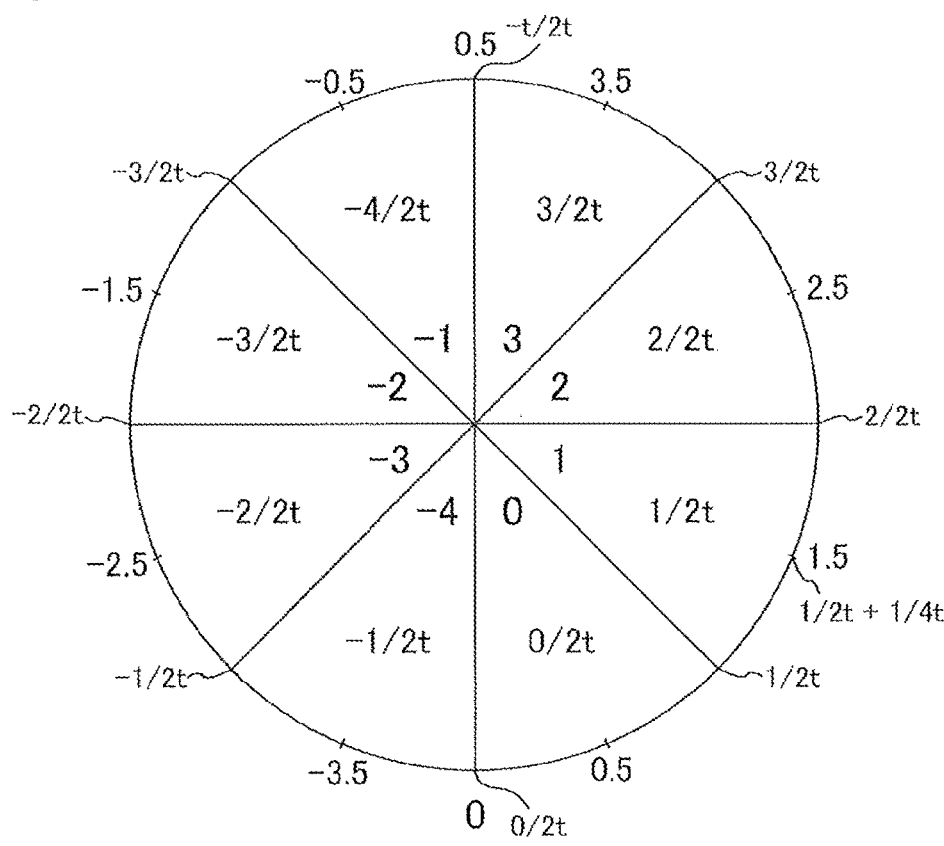
FIG. 10 is a diagram illustrating a circle group corresponding to a ciphertext obtained by inverting a plaintext.

The encryption processing apparatus 1 performs Bootstrapping (first time) for the TLWE ciphertext ca by using a function of univariate polynomial (univariate function) $F_{id}$ (X)

$$F_{id}(X) = \sum_{k=0}^{t-1} \left( \frac{k}{2t} + \frac{1}{4t} \right) \sum_{l=0}^{n/t-1} X^{\frac{n}{t}k+l}$$

that is stepped when coefficients are seen from the highest order to the lowest order and vice versa, thereby obtaining a TLWE ciphertext ca1 illustrated in FIG. 10 in which the order of values (corresponding integer values) on the left half plane of the circle group {T} handling negative values is inverted.

Gate Bootstrapping includes BlindRotate, SampleExtract, and Public Key Switching.

For an operation of a univariate function for an encrypted integer value, a method can be used which is obtained by expanding Gate Bootstrapping in the aforementioned paper (Chillotti et al., 2020). This method is described in the paper "Bootstrapping in FHEW-like Cryptosystems, Daniele Micciancio and Yuriy Polyakov Duality Technologies Feb. 23, 2020". The disclosed method does not set coefficients in a test vector to a constant μ, but sets the result of the function, thereby obtaining a different result depending on the value of a TLWE ciphertext.

FIG. 10 illustrates to which integer value in the original TLWE ciphertext ca a value on the circle group {T} corresponding to the plaintext of the TLWE ciphertext ca1 corresponds, or the correspondence between a value on the circle group {T} as the plaintext of the TLWE ciphertext ca and an integer value as the TLWE ciphertext ca1. As illustrated in FIG. 10, in the ciphertext ca1, the order of values on the left half plane that is a region used as negative values is inverted from that in the TLWE ciphertext ca as a result of Bootstrapping using the polynomial $F_{id}$.

For input of a ciphertext of a non-negative integer from 0 to t−1, the polynomial $F_{id}$ outputs a ciphertext of a non-negative integer from 0 to t−1 and adds an offset of 0.5 to the plaintext. For input of a ciphertext of a negative integer from −t to −1, the polynomial $F_{id}$ outputs a ciphertext of an integer from −1 to −t and adds the offset of 0.5 to the plaintext integer.

As illustrated in FIG. 7A, the width of a slice to which one integer corresponds in the TLWE ciphertext ca is $1/(2t)$. Thus, adding the offset of 0.5 to the plaintext integer a in the TLWE ciphertext ca1 is equivalent to adding an offset of $1/(4t)$ to the plaintext real number $a/(2t)$, for example. Integer representation that includes the offset of $+1/(4t)$ added to the plaintext is represented as $+0.5$.

In a case where a plaintext is in the section of the right half plane of the circle group {T} in FIG. 7A (the plaintext is a non-negative number), the plaintext integer of the TLWE ciphertext ca1 remains within the same slice (region) of the circle group {T} as illustrated in FIG. 10 as a result of the above-described process using the polynomial $F_{id}$. Meanwhile, in a case where a plaintext is a negative number from $-t$ to $-1$ and is in the section of the left half plane of the circle group {T}, the order of the plaintext integers of the TLWE ciphertext ca1 is "inverted" on the circle group {T} as illustrated in FIG. 10 as a result of the above-described process.

For example, in a case where the plaintext integer a in the TLWE ciphertext ca is $-1$ as illustrated in FIG. 7A, this value as a value on the circle group {T} is located in the section from $-1/(2t)$ to 0. Therefore, the term of the highest-order block in the polynomial $F_{id}$ appears as the last term with the sign reversed. The plaintext of the TLWE ciphertext ca1 after the first Bootstrapping thus becomes $-\frac{1}{2}+1/(4t)$ as a value on the circle group {T} and $-t$ as an integer.

In a case where the plaintext integer a in the TLWE ciphertext ca1 is $-t$, this value as a value on the circle group {T} is $-t/(2t)+1/(4t)=-\frac{1}{2}+1/(4t)$ and located in the closest block to $-\frac{1}{2}$. Since the result of sign reversal of the term of the last block in the polynomial $F_{id}$ is obtained as the TLWE ciphertext ca1 after Bootstrapping (first time), the plaintext of the TLWE ciphertext ca1 becomes $-1/(4t)$ as a value on the circle group {T}, that is, $-1$ as an integer.

On the right half plane in FIG. 7A, integers from 0 to $t-1$ are assigned to slices from $0/(2t)$ to $4/(2t)$ counterclockwise from bottom, and the order of plaintext integers is not changed from that in FIG. 7A.

Meanwhile, on the left half plane, integers from $-1$ to $-t$ are assigned to slices from $-t/(2t)$ to $-1/(2t)$ counterclockwise from top, so that the order is inverted from that in FIG. 7A.

In the ciphertext ca1 illustrated in FIG. 10, integers are $-1, -2, -3, -4, 0, 1, 2$, and 3 from top on the circle group {T}. Positive values and negative values are arranged successively on the circle group {T}.

In FIG. 7A, in a case where the TLWE ciphertext ca is a ciphertext of $-1$, for example, the plaintext is located in the section from $-1/(2t)$ to 0 on the circle group {T}.

As a result of the above process, in the TLWE ciphertext ca1, the term of the highest-order block in the polynomial $F_{id}$ appears as the last term with the sign reversed. Therefore, in FIG. 7A, the plaintext of the TLWE ciphertext ca is $-\frac{1}{2}+1/(4t)$ as a value on the circle group {T}. Although this plaintext corresponds to the integer $-t(=-4)$ in FIG. 7A, $-1$ that is the original plaintext integer is assigned in the ciphertext ca1 illustrated in FIG. 10.

In FIG. 7A, in a case where the TLWE ciphertext ca is a ciphertext of $-t$, for example, the plaintext is arranged around $-t/(2t)+1/(4t)$ on the circle group {T} (is slightly larger than $-\frac{1}{2}$). The plaintext is thus located in the closest section to $-\frac{1}{2}$ on the circle group {T}.

As a result of the above process, in the TLWE ciphertext ca1, the term of the last block in the polynomial $F_{id}$ appears with the sign reversed. Therefore, in FIG. 10, the plaintext of the TLWE ciphertext ca is $-1/(2t)+1/(4t)$ as a value on the circle group {T}. Although this plaintext corresponds to integer $-1$ in FIG. 7A, $-t(=-4)$ is assigned as the plaintext integer of the original ciphertext ca in the ciphertext ca1 illustrated in FIG. 10.

As described above, in a case where the integer value to be assigned is made the same before and after bootstrapping by the test vector polynomial $F_{id}(X)$, it can be interpreted that in the TLWE ciphertext ca1, the order of integer values arranged on the left half plane is inverted.

When the above description is generalized, the plaintext of the TLWE ciphertext ca, which is a non-negative number, becomes $a/(2t)+1/(4t)$ in the TLWE ciphertext ca1, and the plaintext integer remains a.

Meanwhile, the plaintext of the TLWE ciphertext ca, which is a negative number, becomes $-(t+1+a)/(2t)+1/(4t)$ in the TLWE ciphertext ca1.

This result is also found from the fact that, when attention is paid to only the numerator of the plaintext, in a case where the plaintext integer a is $-1$, $-(t+1+a)=-\{t+1+(-1)\}=-t$, and in a case where the plaintext integer a is $-t$, $-(t+1+a)=-\{t+1+(-t)\}=-1$. It is confirmed that this result matches the result when the plaintext of the TLWE ciphertext cb is regarded as an integer.

As a result of this process, an offset is added to the plaintext by the term of $1/(4t)$ added to the terms in the polynomial. Therefore, similarly to the TLWE ciphertext ca in FIG. 7A, the position of 0 on the circle group becomes the boundary between slices also in the TLWE ciphertext ca1 in FIG. 10.

As described above, in a case where the plaintext is a negative number, the plaintext to which an integer is assigned is changed. In other words, assuming that the plaintext of the TLWE ciphertext ca1 when being seen as an integer symbol is the same value as the integer of the ciphertext ca, the correspondence between slices for plaintexts of the TLWE ciphertext ca1 and integers is different from that for the TLWE ciphertext ca. As for this correspondence, the order itself of plaintexts on the circle group is not changed between the TLWE ciphertext ca and the TLWE ciphertext ca1. However, on the left half plane to which negative numbers are assigned, the order of plaintext integers respectively assigned to plaintexts is reversed.

Since the order is simply inverted, the order returns to the original order by performing bootstrapping by the test vector polynomial $F_{id}(X)$ twice. That is, when a plaintext is seen as a value on the circle group {T}, it returns to the same slice. However, since the error added to the plaintext has been sufficiently reduced by the properties of bootstrapping, this process can be used as bootstrapping when the entire plane of the circle group is used.

In FIG. 10 in which $t=4$ $(2t=8)$, the above-described offset of 0.5 has been added to the plaintext of the ciphertext. Therefore, the plaintexts located at the centers of slices are $-3.5/(2t), -2.5/(2t), -1.5/(2t), -0.5/(2t), 0.5/(2t), 1.5/(2t), 2.5/(2t)$, and $3.5/(2t)$ from top ($\frac{1}{2}$) of the circle group {T} in the left direction (counterclockwise), respectively.

To these slices, $-1, -2, -3, -4, 0, 1, 2$, and 3 are assigned counterclockwise as the plaintext integers of the TLWE ciphertext ca that has been used as the input for generating the ciphertext ca1, respectively. Integers represented to include the offset of 0.5 are $-0.5, -1.5, -2.5, -3.5, 0.5, 1.5, 2.5$, and 3.5 from top on the circle group {T}.

In Example 2, first Bootstrapping by $F_{id}$ described above is incorporated into a comparison operation by introducing the method called manyLUT, so that the number of times of BlindRotate is reduced.

The method manyLUT is a process that uses a common TLWE ciphertext and performs BlindRotate for different test vector polynomials (refers to different lookup tables).

As in Example 1, the encryption processing apparatus 1 inputs the TLWE ciphertext ca to the first operation unit 12 and adds a trivial ciphertext having 1/(4t) as the plaintext to −ca obtained by reversing the TLWE ciphertext ca in a homomorphic manner to obtain the TLWE ciphertext ca' corresponding to −ca+(0, 1/(4t)).

The encryption processing apparatus 1 inputs the TLWE ciphertext ca' to the first Bootstrapping unit 41 and performs BlindRotate using the following polynomial F2(X)

$$F2(X) = \sum_{i=0}^{\frac{n}{2}-1} -\frac{1}{32} X^{2i}$$

as a test vector polynomial for the ciphertext ca' to obtain the TRLWE ciphertext r11. Although each element in the TLWE ciphertext ca' is usually multiplied by 2n and rounded, rounding off after multiplication by 2n is performed at the second least significant bit in order to make the least significant bit 0. This process is usually performed in manyLUT and is a process for keeping at least even and odd of the order unchanged when each term in a plaintext polynomial cycles before and after BlindRotate.

The polynomial F2(X) is different from the polynomial F1(X) in Example 1 in that odd order coefficients are 0 and therefore no odd order term is included. This is because in order to perform manyLUT, the retained value is changed depending on whether the exponent part is even or odd.

The encryption processing apparatus 1 inputs the TRLWE ciphertext r11 to the second operation unit 13, doubles the TRLWE ciphertext r11, and further adds a trivial ciphertext (0, F3(X)) having the following polynomial F3(X)

$$F3(X) = \sum_{i=0}^{\frac{n}{2}-1} \left( \frac{1}{8} X^{2i} + \left( \frac{\lfloor 2ti/n \rfloor}{2t} + \frac{1}{4t} \right) X^{2i+1} \right)$$

as the plaintext in a homomorphic manner, thereby obtaining the TRLWE ciphertext r11' corresponding to r11×2+(0, F3(X)).

The encryption processing apparatus 1 inputs the TLWE ciphertext ca and the TLWE ciphertext cb to the third operation unit 14, adds the TLWE ciphertext cb to the TLWE ciphertext ca in a homomorphic manner, and subtracts a trivial ciphertext (0, 1/(4t)) in a homomorphic manner, thereby obtaining the TLWE ciphertext cc'.

The encryption processing apparatus 1 inputs the ciphertext cc' to the second Bootstrapping unit 42 and performs BlindRotate using the TRLWE ciphertext r11' as a test vector polynomial for the ciphertext cc' to obtain the TRLWE ciphertext r2'. Here, while each element is usually multiplied by 2n and rounded, adjustment is further performed to make the least significant bit 0. In summary, rounding off is performed at the position that becomes the least significant bit as a result of multiplication by 2n. For example, it suffices that, after multiplication by n and rounding are performed, multiplication by 2 is performed additionally. This process is usually performed in manyLUT.

The encryption processing apparatus 1 then performs SampleExtract for the TRLWE ciphertext r2' at the position of 0, thereby extracting the coefficient of the 0th order term (a constant term) of the TRLWE ciphertext r2' and obtaining the TLWE ciphertext c3'.

In some cases, it is not necessary to perform a homomorphic operation between the TLWE ciphertext ca and the TLWE ciphertext cb by the third operation unit 14, and the TLWE ciphertext cc' having the same plaintext as the TLWE ciphertext ca is used. In those cases, BlindRotate by the second Bootstrapping unit 42 for the TLWE ciphertext cc' can be regarded as BlindRotate for the TLWE ciphertext ca.

As in Example 1, the encryption processing apparatus 1 adds the constant polynomial F3(X) to the TRLWE ciphertext r11 that is the output of BlindRotate by the first Bootstrapping unit 41, and then performs BlindRotate again by the second Bootstrapping unit 42. The TRLWE ciphertext r11' to which the constant polynomial F3(X) has been added is different in properties between even orders and odd orders in order to be subjected to manyLUT.

Since the coefficients of odd order terms are all 0 in the polynomial F2(X), all coefficients of odd order terms are 0 in the TRLWE ciphertext r11 no matter for how many terms the coefficients are caused to cycle by BlindRotate by the first Bootstrapping unit 41. As for the TRLWE ciphertext r11', when the constant polynomial F3(X) is added to the TRLWE ciphertext r11, the value of the coefficient of each odd order term in the polynomial F3(X) is added to the value of the coefficient of that odd order term in the TRLWE ciphertext r11.

This addition is addition to 0, and therefore the value of the coefficient of the odd order term in the polynomial F3(X) is set for the odd order term in the TRLWE ciphertext r11'. The coefficient added to the odd order term is the same as that in the polynomial $F_{id}$ described above. That is, the coefficient of each odd order term in the TRLWE ciphertext r11' is the coefficient of that odd order term in the polynomial $F_{id}$.

For the common TLWE ciphertext cc' based on ca+cb, the encryption processing apparatus 1 performs BlindRotate for odd orders in the TRLWE ciphertext r11' and BlindRotate for even orders simultaneously by the second Bootstrapping unit 42. The odd orders are processed by the polynomial $F_{id}$, and the even orders are processed by even orders in the polynomial F2(X).

In the polynomial F2(X), even order coefficients may be set to 0. In this case, the polynomial F3(X) is configured so as to add the coefficients in $F_{id}$ to even orders in the F2(X), unlike the above description.

In the present embodiment, either even order coefficients or odd order coefficients in a test vector polynomial for performing manyLUT are set to 0. Thus, the influence of BlindRotate in the first half (BlindRotate by the first Bootstrapping unit 41) on the orders for which the coefficients are set to 0 can be ignored. This is because change does not occur no matter for how many terms a series of 0 is caused to cycle. Thereafter, a test vector polynomial having a feature of being stepped, for example, is added. Thus, the result affected only by BlindRotate by ca+cb can be obtained by BlindRotate in the second half (BlindRotate by the second Bootstrapping unit 42). This is because in many LUT separate operations can be simultaneously performed by using even order terms and odd order terms.

Figure 11:
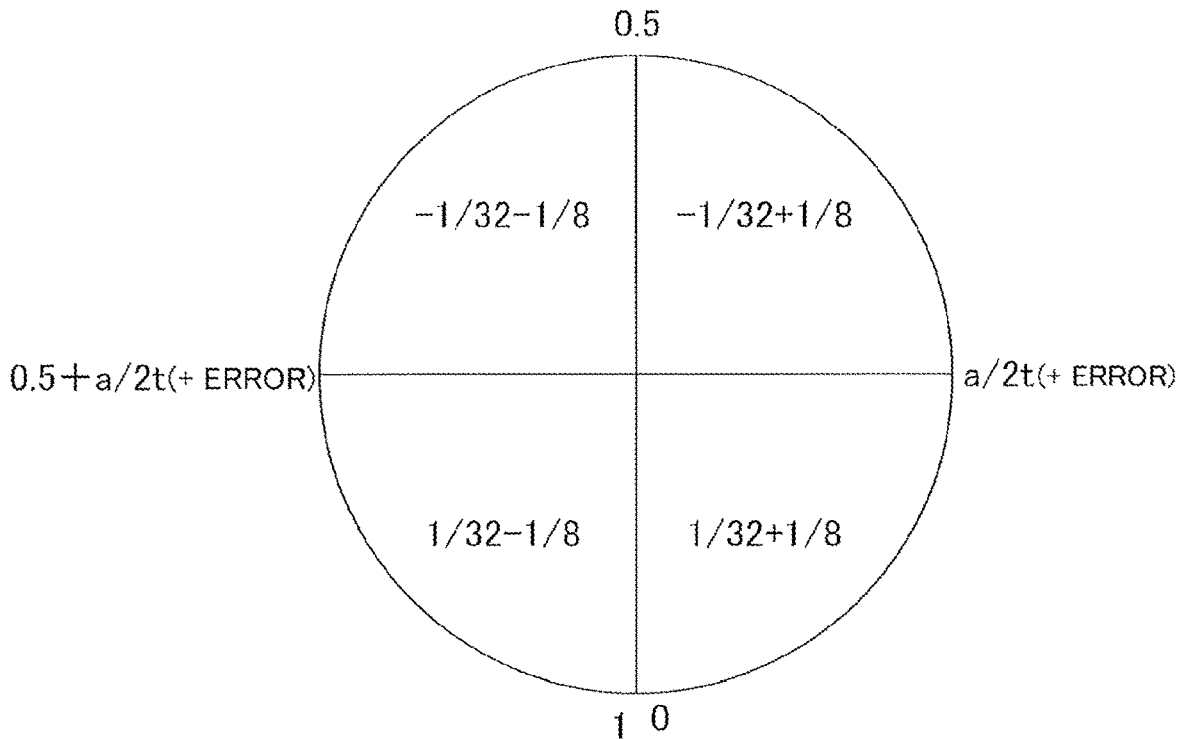
FIG. 11 is an explanatory diagram of a ciphertext representing the result of addition between ciphertexts.

FIG. 11 illustrates, for even orders, how the plaintext of the TLWE ciphertext c3' obtained by ca+cb is selected in a case where the plaintext a of the TLWE ciphertext ca is non-negative (a≥0) as an integer.

In the case where the plaintext a of the TLWE ciphertext ca (the value on the circle group {T} is a/(2t)) is non-negative as an integer, the plaintext a is in the section of the right half plane of the circle group {T}, as illustrated in FIG. 11.

A carry occurs in a case where the plaintext a+b of the ciphertext ca+cb obtained by homomorphic addition of the TLWE ciphertext cb to the TLWE ciphertext ca on the circle group {T} crosses 0.5 on the circle group {T} counterclockwise to become a value on the left half plane. In that case, the plaintext φ(c3') of the TLWE ciphertext c3' is −1/32−1/8, as illustrated in FIG. 11.

If the plaintext a is on the right half plane of the circle group {T}, (ca+cb), that is, the plaintext a+b does not cross the boundary of 0.5+a/(2t) both clockwise and counterclockwise. Therefore, the plaintext φ(c3') of the TLWE ciphertext c3' does not become 0 due to an excessively large carry. This is because the plaintext a+b always falls within the range of +0.5 with respect to a/(2t) as a reference.

Figures 12, 13:
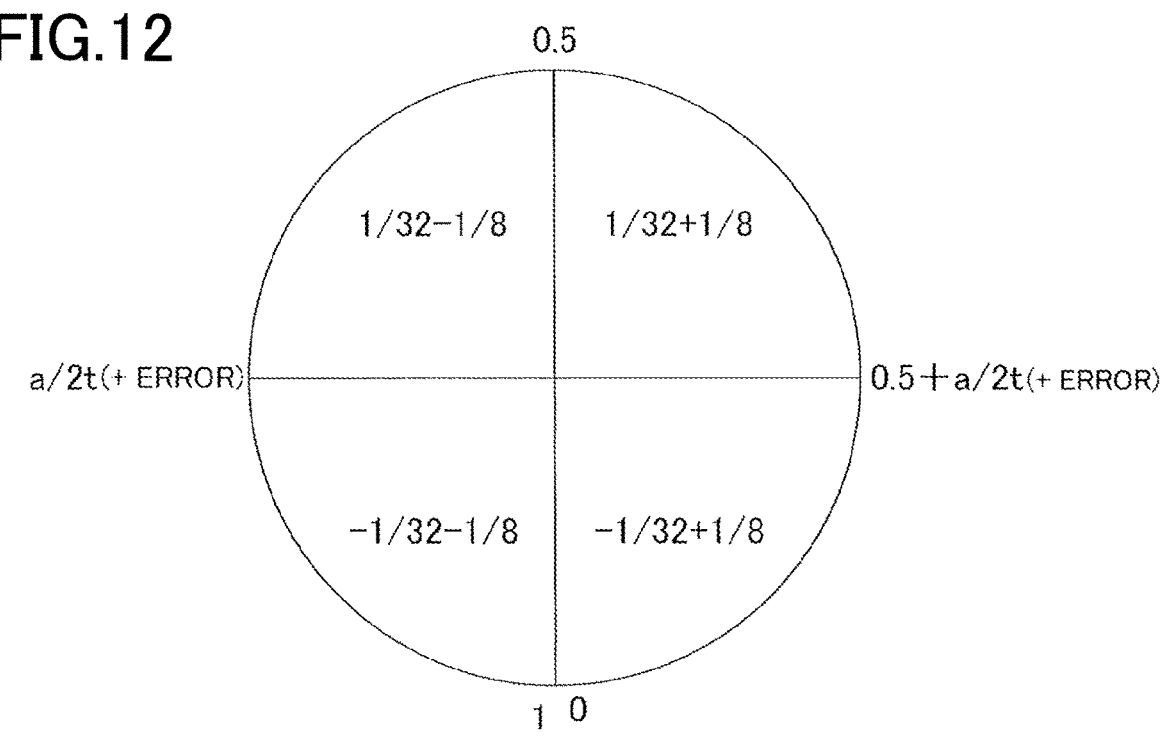
FIG. 12 is an explanatory diagram of a ciphertext representing the result of addition between ciphertexts.
FIG. 13 is a diagram illustrating values that a ciphertext can take depending on the result of subtraction between ciphertexts.

FIG. 12 illustrates, for even orders, how the plaintext of the TLWE ciphertext c3' obtained by ca+cb is selected in a case where the plaintext a of the TLWE ciphertext ca is negative (a<0) as an integer.

In the case where the plaintext a of the TLWE ciphertext ca (the value on the circle group {T} is a/(2t)) is negative as an integer, the plaintext a is in the section of the left half plane of the circle group {T}, as illustrated in FIG. 12.

A borrow occurs in a case where the plaintext a+b of the ciphertext ca+cb obtained by homomorphic addition of the TLWE ciphertext cb to the TLWE ciphertext ca on the circle group {T} crosses 0.5 on the circle group {T} clockwise to become a value in the right half plane. In that case, the plaintext φ(c3') of the TLWE ciphertext c3' is 1/32+1/8, as illustrated in FIG. 12.

If the plaintext a is in the section of the left half plane of the circle group {T}, φ(ca+cb), that is, the plaintext a+b does not cross 0.5+a/(2t) both clockwise and counterclockwise. Therefore, the plaintext φ(c3') of the TLWE ciphertext c3' does not become 0 due to an excessively large borrow. This is because the plaintext a+b always falls within the range of +0.5 with respect to a/(2t) as a reference.

As possible values obtained as the plaintext φ(c3') of the TLWE ciphertext c3', values of all combinations obtained by addition and/or subtraction between 1/32 and 1/8 used in the polynomial F1(X) and the polynomial F3(X) (four combinations based on whether each polynomial is positive or negative) are obtained.

As the plaintext φ(c3') of the TLWE ciphertext c3', any one of all combinations obtained from the sum of ±1/8 and ±1/32 is selected. A large number of types of values obtained means that a large amount of information is obtained from the TLWE ciphertext c3', and this point is important for efficient calculation.

In Example 2, the polynomial F3(X) is added to the TRLWE ciphertext r11 obtained by the first BlindRotate using the polynomial F2(X) as a test vector by the first Bootstrapping unit 41 in a homomorphic manner (r11×2+(0, F3(X)), and the result is used in place of a trivial ciphertext formed by a test vector polynomial used in the second BlindRotate by the second Bootstrapping unit 42 (as an object to be rotated).

If homomorphic addition/subtraction by the second operation unit 13 in the middle is not performed, the same effect is obtained even when only addition/subtraction of a TLWE ciphertext as the amount of rotation by BlindRotate is performed, and the operation speed is higher. In this case, however, if the polynomial F2(X) is a "flat polynomial" in which all coefficients are the same value, only two types of values can be obtained.

Meanwhile, in the present embodiment, the polynomial F3(X) is added in the middle. Accordingly, four types of plaintexts illustrated in FIGS. 11 and 12 can be obtained even if both the polynomials F2(X) and F3(X) as test vectors are flat polynomials.

That is, when processes are performed in the order of BlindRotate, homomorphic addition/subtraction, and BlindRotate, $2^2=4$ types of plaintexts can be acquired.

Further, when processes are performed in the order of BlindRotate, homomorphic addition/subtraction, BlindRotate, homomorphic addition/subtraction, and BlindRotate, more plaintexts, i.e., $2^3=8$ types of plaintexts can be acquired even if polynomials are flat.

By repeating BlindRotate via homomorphic addition/subtraction, for example, in the order of BlindRotate, homomorphic addition/subtraction, BlindRotate, homomorphic addition/subtraction, BlindRotate, homomorphic addition/subtraction, and BlindRotate, a ciphertext can be obtained which can acquire more plaintexts.

The TLWE ciphertext c3' is a ciphertext that has a plaintext depending on the presence or absence of a carry or a borrow and can be a flag of a carry or a borrow.

However, the value of the plaintext a cannot be known without decrypting the TLWE ciphertext ca. Therefore, only from the information up to this point, it is not possible to identify whether the plaintext a is in the section of the right half plane of the circle group {T} or in the section of the left half plane of the circle group {T} based on the TLWE ciphertext c3'. A ciphertext is required which indicates whether the plaintext a is in the section of the right half plane of the circle group {T} or in the section of the left half plane of the circle group {T}.

Referring back to FIG. 3, the encryption processing apparatus 1 performs SampleExtract for the TRLWE ciphertext r11 at the position of n−2 by the first Bootstrapping unit 41, thereby extracting the coefficient of the (n−2)th order term that is the highest order term among even order terms and obtaining the TLWE ciphertext c2'.

Since the TLWE ciphertext c2' is extracted from the TRLWE ciphertext r11 obtained by BlindRotate using −ca for the above F2(X) in which the coefficients of all the terms are −1/32, it is a ciphertext obtained by rotating the above polynomial F2(X) by −a to the lower-order direction. In other words, the TLWE ciphertext c2' has rotated the above polynomial F2(X) by a to the higher-order direction.

In a case where the plaintext integer a≥0 is satisfied, that is, the plaintext φ(ca) of the TLWE ciphertext ca is in the section of the right half plane of the circle group, −1/32, that is the coefficients in F2(X) becomes the plaintext of the TLWE ciphertext c2' as it is.

In a case where the plaintext integer a<0 is satisfied, that is, the plaintext φ(ca) is in the section of the left half plane of the circle group, 1/32, obtained by reversing the sign of −1/32, that is the coefficients in F2(X) becomes the plaintext of the TLWE ciphertext c2'.

This TLWE ciphertext c2' is a ciphertext that has, as the plaintext, information indicating whether the plaintext a of the TLWE ciphertext ca is in the section of the right half plane of the circle group {T} or in the section of the left half plane of the circle group {T}.

The encryption processing apparatus 1 inputs the TLWE ciphertext c2' and the TLWE ciphertext c3' to the fourth operation unit 15 and calculates c3'+2×c2' to obtain the TLWE ciphertext c4'. This operation can be realized by homomorphic multiplication by a scalar and homomorphic addition that are usually performed.

The plaintext of the TLWE ciphertext c2' is 1/32, in a case where the plaintext a of the TLWE ciphertext ca is in the section of the left half plane of the circle group {T}, and the plaintext of the TLWE ciphertext c3' is $\frac{1}{32}$,$+\frac{1}{8}$ in a case where a borrow occurs in a+b. Therefore, the plaintext of the TLWE ciphertext c4' is $\frac{7}{32}$, from $(\frac{1}{32}+\frac{1}{8})+(\frac{1}{32})\times2$. In the TLWE ciphertext c4', the value of the plaintext of the TLWE ciphertext c3' is shifted by $\frac{1}{16}$ to the positive side on the circle group {T}. Therefore, only in a case where the plaintext a is in the section of the left half plane of the circle group {T} and a borrow occurs, the plaintext φ(c4') of the TLWE ciphertext c4' becomes $\frac{7}{32}$.

The plaintext of the TLWE ciphertext c2' is $-\frac{1}{32}$, in a case where the plaintext a of the TLWE ciphertext ca is in the section of the right half plane of the circle group {T}, and the plaintext of the TLWE ciphertext c3' is $-\frac{1}{32}-\frac{1}{8}$ in a case where a carry occurs in a+b. Therefore, the plaintext of the TLWE ciphertext c4' is $-\frac{7}{32}$, from $(-\frac{1}{32}-\frac{1}{8})+(\frac{1}{32})\times2$. In the TLWE ciphertext c4', the value of the plaintext of the ciphertext c3' is shifted by $\frac{1}{16}$ to the negative side on the circle group {T}. Therefore, only in a case where the plaintext a is in the section of the right half plane of the circle group {T} and a carry occurs, the plaintext φ(c4') of the TLWE ciphertext c4' becomes $-\frac{7}{32}$,.

Neither carry nor borrow occurs in a case where the plaintext a is in the section of the right half plane of the circle group {T} and is 0 as an integer. Further, no carry occurs in a case where the plaintext a is in the section of the left half plane of the circle group {T}, and no borrow occurs in a case where the plaintext a is in the section of the right half plane of the circle group {T}.

Further, the value of the plaintext of the ciphertext c3' is shifted by $\frac{1}{16}$ to opposite directions depending on whether the plaintext a of the TLWE ciphertext ca is in the section of the left half plane of the circle group or in the section of the right half plane, as described above.

From the above description, the plaintext φ(c4') of the TLWE ciphertext c4', for example, is $\frac{7}{32}$ if a borrow occurs in the plaintext a+b, and is $-\frac{7}{32}$ if a carry occurs. Otherwise, the plaintext φ(c4') is any of $-\frac{5}{32}$, $-\frac{3}{32}$, $-\frac{1}{32}$, $\frac{1}{32}$, $\frac{3}{32}$, and $\frac{5}{32}$ but does not become $-\frac{7}{32}$ or $\frac{7}{32}$.

That is, the TLWE ciphertext c4' is a ciphertext that makes it possible to determine the presence or absence of a carry or a borrow in ca+cb based on the value of its plaintext φ(c4').

Summarizing FIGS. 11 and 12, in either case of a case where the plaintext a of the TLWE ciphertext ca is in the section of the left half plane of the circle group {T} and a case where the plaintext a is in the section of the right half plane, the plaintext of the TLWE ciphertext c3' is either one of two values $\pm\frac{1}{32}$ and $+\frac{1}{8}$ if the result of a+b is on the right half plane of the circle group {T}, and either one of two values $\pm\frac{1}{32}$ and $-\frac{1}{8}$ if the result of a+b is on the left half plane.

Further, $\pm\frac{1}{16}$ is added depending on the value of the plaintext a. Therefore, the plaintext @(c4') of the TLWE ciphertext c4' is any of $\pm\frac{1}{32}\pm\frac{1}{16}$, and $+\frac{1}{8}$ if a+b is in the section of the right half plane of the circle group {T}, and any of $\pm\frac{1}{32}\pm\frac{1}{16}$, and $-\frac{1}{8}$ if a+b is in the section of the left half plane of the circle group {T}.

Here, $\pm\frac{1}{32}\pm\frac{1}{16}$, and $+\frac{1}{8}$ are all larger than 0, and $\pm\frac{1}{32}$, $\pm\frac{1}{16}$, and $-\frac{1}{8}$ are all smaller than 0.

From the above description, if φ(c4')>0, a+b is in the section of the right half plane of the circle group {T}. To the contrary, if φ(c4')<0, a+b is in the section of the left half plane of the circle group {T}.

That is, the TLWE ciphertext c4' is a ciphertext that makes it possible to determine whether the result of a+b is in the section of the right half plane of the circle group {T} or the section of the left half plane based on the value of the plaintext φ(c4').

The encryption processing apparatus 1 inputs the TLWE ciphertext c4' to the third Bootstrapping unit 43 and performs BlindRotate using the following polynomial F2'(X)

$$F2'(X) = \sum_{i=0}^{n-1} \frac{1}{4t} X^i$$

as a test vector polynomial for the TLWE ciphertext c4' to obtain the TRLWE ciphertext r3.

The encryption processing apparatus 1 then performs SampleExtract for the TRLWE ciphertext r3' at a plurality of portions ($2n\times\frac{3}{16}$, $2n\times\frac{13}{16}$, and 0) on the circle group {T} to extract the ciphertexts cd', ce', and cf.

The encryption processing apparatus 1 then inputs the ciphertexts cd', ce', and cf to the fifth operation unit 16 and adds a trivial ciphertext (0, 1/(2t)) to the ciphertexts cd', ce', and cf in a homomorphic manner, thereby obtaining the TLWE ciphertext c5, the TLWE ciphertext c6, and the TLWE ciphertext c7, respectively.

The ciphertext obtained by adding (0, 1/(2t)) to the TLWE ciphertext cd' extracted by SampleExtract at the position of $2n\times\frac{3}{16}$ is the TLWE ciphertext c5.

The ciphertext obtained by adding (0, 1/(2t)) to the TLWE ciphertext ce' extracted by SampleExtract at the position of $2n\times\frac{3}{16}$ is the TLWE ciphertext c6.

The ciphertext obtained by adding (0, 1/(2t)) to the TLWE ciphertext cf extracted by SampleExtract at the position of 0 is the TLWE ciphertext c7.

The ciphertext c5 is a ciphertext for which φ(c5) is 1/(4t) (0 as an integer) if there is a carry, and is 1/(2t)+1/(4t) (1 as an integer) if there is no carry.

The ciphertext c6 is a ciphertext for which φ(c6) is 1/(4t) (0 as an integer) if there is a borrow, and is 1/(2t)+1/(4t) (1 as an integer) if there is no borrow.

The ciphertext c7 is a ciphertext for which φ(c7) is 1/(4t) (0 as an integer) if a+b is in the section of the left half plane of the circle group {T}, and is 1/(2t)+1/(4t) (1 as an integer) if a+b is in the section of the right half plane of the circle group {T}.

The encryption processing apparatus 1 obtains the ciphertexts c5, c6, and c7 by calculation, thereby performing comparison with $-\frac{7}{32}$ (determination whether a carry occurs), comparison with $\frac{7}{32}$ (determination whether a borrow occurs), and determination whether a+b is in the section of the right half plane of the circle group {T} or the left half plane by one BlindRotate simultaneously.

As a result of the above processes, the TLWE ciphertext c5 indicating the presence or absence of a carry in binary, the TLWE ciphertext c6 indicating the presence or absence of a borrow in binary, and the ciphertext c7 indicating whether a+b is in the section of the right half plane of the circle group {T} or the left half plane in binary are obtained.

Those ciphertexts can be converted to any ciphertexts that can take two values suitable for application by changing the coefficients in F2'(X) used for BlindRotate, adjusting the plaintext of a trivial ciphertext as the offset for the ciphertext after SampleExtract, and/or performing an additional operation for the TLWE ciphertext c5, the TLWE ciphertext c6, and/or the TLWE ciphertext c7.

Further, the encryption processing apparatus 1 performs SampleExtract for the TRLWE ciphertext r2' to extract the coefficient of the first order term, inputs that TLWE ciphertext to the fourth Bootstrapping unit 44, and performs Bootstrapping (second BlindRotate) using the polynomial $F_{id}(X)$ as a test vector polynomial, thereby obtaining the TLWE ciphertext c9. Thus, the TLWE ciphertext c9 correctly corresponding to the plaintext φ(c9)=a+b regarding negative numbers can be obtained without increasing the additional computation amount too much.

Example 3

Examples 1 and 2 are based on applying a+b to addition of multiple precision integers.

In Example 3 as a modification of Example 1, application to subtraction on a division element basis, which is necessary for subtraction between multiple precision integers, is considered.

Since reversing the sign of the plaintext of the TLWE ciphertext cb can be performed as a homomorphic operation, the ciphertext cb is subjected to sign reversal to be converted to a ciphertext −cb.

In the present embodiment, an offset of 0.5 is added for convenience of associating each of slices divided from a circle group with an integer. Therefore, adjustment is required which performs a homomorphic operation of a trivial ciphertext (0, 1/(4t)) corresponding to the offset of 0.5.

The encryption processing apparatus 1 subtracts a trivial ciphertext (0, 1/(4t)) from the ciphertext −ca obtained by reversing the ciphertext ca in a homomorphic manner to obtain the ciphertext ca' corresponding to −ca−(0, 1/(4t)).

The encryption processing apparatus 1 then performs BlindRotate using the polynomial F1(X), which is the same as that in Example 1, as a test vector polynomial for the ciphertext ca' to obtain the TRLWE ciphertext r1.

Subsequently, the encryption processing apparatus 1 subtracts a trivial ciphertext (0, F1(X)) having the polynomial F1(X) as the plaintext from the TRLWE ciphertext r1 in a homomorphic manner to obtain the new TRLWE ciphertext r1' corresponding to (r1−(0, F1(X)).

The encryption processing apparatus 1 subtracts the ciphertext cb from the ciphertext ca in a homomorphic manner and adds a trivial ciphertext (0, 1/(4t)), thereby obtaining the ciphertext cc corresponding to ca−cb+(0, 1/(4t)).

The encryption processing apparatus 1 performs BlindRotate using the TRLWE ciphertext r1' as a test vector polynomial by using the ciphertext corresponding to ca−cb+(0, 1/(4t)) to obtain the TRLWE ciphertext r2.

The encryption processing apparatus 1 performs SampleExtract at the position of 0, thereby extracting the coefficient of the 0th order term (a constant term) of the TRLWE ciphertext r2 and obtaining the TLWE ciphertext c3. The subsequent processes are the same as those in Example 1 described above.

According to Example 3, in comparison of a and b between one ciphertext and one ciphertext, the presence or absence of a carry and the presence or absence of a borrow by a−b is found by the TLWE ciphertexts c5 and c6.

Therefore, a case where a−b is carried up (for example, (t−1)−(−t)=2t−1) and a case where a−b is carried down (for example, (−t)−(t−1)=−2t+1) can be detected.

Example 4

In Example 4 as a modification of Example 2, comparison between the plaintext integer a and the plaintext integer b is performed in ciphertexts each representing an integer.

In this case, if a−b is negative, a<b. If a−b is non-negative, a≥b. The comparison result is found from the sign of ca−cb, and a carry or a borrow affects the comparison result.

In Example 4, the encryption processing apparatus 1 subtracts a trivial ciphertext (0, 1/(4t)) from the ciphertext −ca obtained by reversing the ciphertext ca in a homomorphic manner to obtain the ciphertext ca' corresponding to −ca−(0, 1/(4t)).

The encryption processing apparatus 1 performs BlindRotate using the above polynomial F2(X) as a test vector polynomial for the ciphertext ca' to obtain the TRLWE ciphertext r11.

At this time, a process of multiplying each element in the ciphertext ca' by 2n and then rounding the multiplication result to make the least significant bit 0 is performed, as in Example 2.

The encryption processing apparatus 1 doubles the TRLWE ciphertext r11 and adds a trivial ciphertext (0, F3(X)) having the above polynomial F3(X) as the plaintext in a homomorphic manner, thereby obtaining a TRLWE ciphertext corresponding to r11×2+(0, F3(X)).

The encryption processing apparatus 1 subtracts the ciphertext cb from the ciphertext ca in a homomorphic manner and adds a trivial ciphertext (0, 1/(4t)) in a homomorphic manner, thereby obtaining a ciphertext corresponding to ca−cb+(0, 1/(4t)).

The encryption processing apparatus 1 performs BlindRotate for the TRLWE ciphertext r11' based on the result of multiplying each coefficient in the ciphertext ca−cb+(0, 1/(4t)) by 2n and rounding the multiplication result at the least significant bit, thereby obtaining the TRLWE ciphertext r2'.

The encryption processing apparatus 1 then performs SampleExtract for the TRLWE ciphertext r2' at the position of 0, thereby extracting the coefficient of the 0th order term (a constant term) of the TRLWE ciphertext r2' and obtaining the TLWE ciphertext c3'. The subsequent processes are the same as those in Example 2 described above.

Accordingly, in comparison of a and b between one ciphertext and one ciphertext, the presence or absence of a carry and the presence or absence of a borrow by a−b is found by the TLWE ciphertexts c5 and c6. Therefore, a case where a−b is carried up (for example, (t−1)−(−t)=2t−1) and a case where a−b is carried down (for example, (−t)−(t−1)=−2t+1) can be detected.

In addition, according to Example 4, it can be found from the TLWE ciphertext c7 whether a−b is in the section of the right half plane or the left half plane on the circle group {T}.

FIG. 13 is a diagram illustrating values that a ciphertext can take depending on the result of subtraction between ciphertexts and, particularly in association with Example 2, representing possible patterns of the TLWE ciphertexts c5 to c8 depending on the relation of ca−cb. As for c8, c8=c7+c6−c5 is calculated by homomorphic addition and subtraction.

Since −t≤a and b≤t−1 from the assumption, −2t+1≤a−b≤2t−1 is always established. Therefore, a−b applies to any of four patterns of a−b>t−1, t−1≥a−b≥0, 0>a−b≥−t, and −t>a−b represented in FIG. 13.

As illustrated in FIG. 13, in a case of a−b>t−1, a carry occurs, and the plaintext φ(c5) of the TLWE ciphertext c5 corresponding to the presence or absence of a carry is 0 as an integer.

A borrow does not occur at the same time as occurrence of a carry, and the TLWE ciphertext c6 corresponding to the presence or absence of a borrow is 1 as an integer.

In this case, a−b is in the section of the left half plane of the circle group {T}, and the plaintext φ(c7) of the TLWE ciphertext c7 corresponding to this information is 0 as an integer.

The plaintext $\varphi(c8)$ of the TLWE ciphertext c8 is 1 as an integer.

In a case of $t-1 \geq a-b \geq 0$, no carry occurs, and the plaintext $\varphi(c5)$ of the TLWE ciphertext c5 is 1 as an integer.

A borrow also does not occur. The plaintext $\varphi(c6)$ of the TLWE ciphertext c6 is thus 1 as an integer.

In this case, a–b is in the section of the right half plane of the circle group $\{T\}$, and the plaintext $\varphi(c7)$ of the TLWE ciphertext c7 is 1 as an integer.

The plaintext $\varphi(c8)$ of the TLWE ciphertext c8 is 1 as an integer.

In a case of $0>a-b \geq -t$, a carry does not occur, and the plaintext $\varphi(c5)$ of the TLWE ciphertext c5 is 1 as an integer.

A borrow also does not occur. The plaintext $\varphi(c6)$ of the TLWE ciphertext c6 is thus 1 as an integer.

In this case, a–b is in the section of the left half plane of the circle group $\{T\}$, and the plaintext $\varphi(c7)$ of the TLWE ciphertext c7 is 0 as an integer.

The plaintext $\varphi(c8)$ of the TLWE ciphertext c8 is 0 as an integer.

In a case of $-t \geq a-b$, no carry occurs, and the plaintext $\varphi(c5)$ of the TLWE ciphertext c5 is 1 as an integer.

A borrow occurs, and the plaintext $\varphi(c6)$ of the TLWE ciphertext c6 is thus 0 as an integer.

In this case, a–b is in the section of the right half plane of the circle group $\{T\}$, and the plaintext $\varphi(c7)$ of the TLWE ciphertext c7 is 1 as an integer.

The plaintext $\varphi(c8)$ of the TLWE ciphertext c8 is 0 as an integer.

As can be seen from FIG. 13, in a case where a carry occurs as a result of ca–cb, no borrow occurs, and the plaintext of the calculation result of ca–cb is always located in the section of the left half plane of the circle group $\{T\}$.

In a case where a borrow occurs as a result of ca–cb, a carry does not occur, and the plaintext of the calculation result of ca–cb is always located in the section of the right half plane (0 to 0.5) of the circle group $\{T\}$.

In order to check the magnitude relation between a and b, it is necessary to check whether the result is negative or non-negative including a carry and a borrow. Therefore, the presence or absence of a carry or a borrow is prioritized over whether a–b is in the section of the right half plane or the section of the left half plane.

In a case where neither carry nor borrow occurs as a result of ca–cb, and the plaintext of the calculation result of ca–cb is non-negative, the plaintext is located in the section of the right half plane of the circle group $\{T\}$.

In a case where neither carry nor borrow occurs as a result of ca–cb, and the plaintext of the calculation result of ca–cb is negative, the plaintext is located in the section of the left half plane of the circle group $\{T\}$.

From the above description, the plaintext $\varphi(c8)$ of c8 is 1 as an integer if $a-b \geq 0$. If $a-b<0$, $\varphi(c8)=0$. Rearranging the equations, $\varphi(c8)=1$ for $a \geq b$, and $\varphi(c8)=0$ for $a<b$.

The encryption processing apparatus 1 can obtain the TLWE ciphertext c8 representing the comparison result from the TLWE ciphertexts c5, c6, and c7 without performing complicated computation processing with high processing load, such as Bootstrapping. Starting with the first ciphertexts ca and cb, BlindRotate is used only twice.

Figure 14:
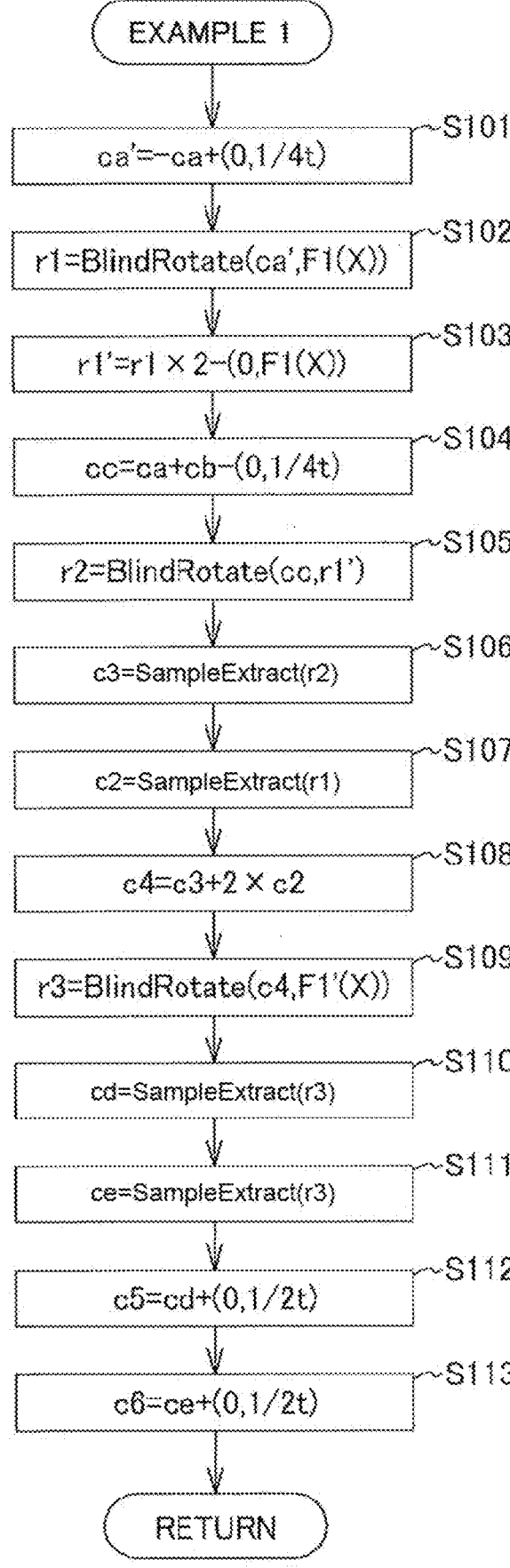
FIG. 14 is a flowchart for explaining a processes in Example 1.

FIG. 14 is a flowchart for explaining the processes in Example 1.

At Step S101, the encryption processing apparatus 1 (the first operation unit 12) performs a homomorphic operation $-ca+(0, 1/(4t))$ for the ciphertext ca input thereto.

At Step S102, the encryption processing apparatus 1 (the first Bootstrapping unit 41) performs BlindRotate for the TLWE ciphertext ca' by using the polynomial F1(X) as a test vector polynomial to obtain the TRLWE ciphertext r1.

At Step S103, the encryption processing apparatus 1 (the second operation unit 13) performs a homomorphic operation $r1 \times 2-(0, F1(X))$ for the TRLWE ciphertext r1, thereby obtaining the TRLWE ciphertext r1'.

At Step S104, the encryption processing apparatus 1 (the third operation unit 14) performs a homomorphic operation $ca+cb-(0, 1/(4t))$ for the TLWE ciphertext ca and the TLWE ciphertext cb, thereby obtaining the TLWE ciphertext cc.

At Step S105, the encryption processing apparatus 1 (the second Bootstrapping unit 42) performs BlindRotate for the TLWE ciphertext cc by using the TRLWE ciphertext r1' as a test vector polynomial to obtain the TRLWE ciphertext r2.

At Step S106, the encryption processing apparatus 1 (the second Bootstrapping unit 42) performs SampleExtract for the TRLWE ciphertext r2 to obtain the TLWE ciphertext c3.

At Step S107, the encryption processing apparatus 1 (the first Bootstrapping unit 41) performs SampleExtract for the TRLWE ciphertext r1 to obtain the TLWE ciphertext c2.

At Step S108, the encryption processing apparatus 1 (the fourth operation unit 15) performs a homomorphic operation $c3+2 \times c2$ for the TLWE ciphertext c3 and the TLWE ciphertext c2, thereby obtaining the TLWE ciphertext c4.

At Step S109, the encryption processing apparatus 1 (the third Bootstrapping unit 43) performs BlindRotate for the TLWE ciphertext c4 by using the polynomial F1'(X) as a test vector polynomial to obtain the TRLWE ciphertext r3.

At Step S110 and Step S111, the encryption processing apparatus 1 (the third Bootstrapping unit 43) performs SampleExtract for the TRLWE ciphertext r3 twice at different portions, thereby obtaining the TLWE ciphertexts cd and ce.

At Step S112 and Step S113, the encryption processing apparatus 1 (the fifth operation unit 16) performs homomorphic addition of adding $(0, 1/(2t))$ to the TLWE ciphertexts cd and ce, thereby obtaining the TLWE ciphertexts c5 and c6, respectively. The homomorphic addition may be executed every time SampleExtract is executed. The homomorphic addition at Step S104 may be executed before or in the course of the processes at Steps S101 to S103.

Figure 15:
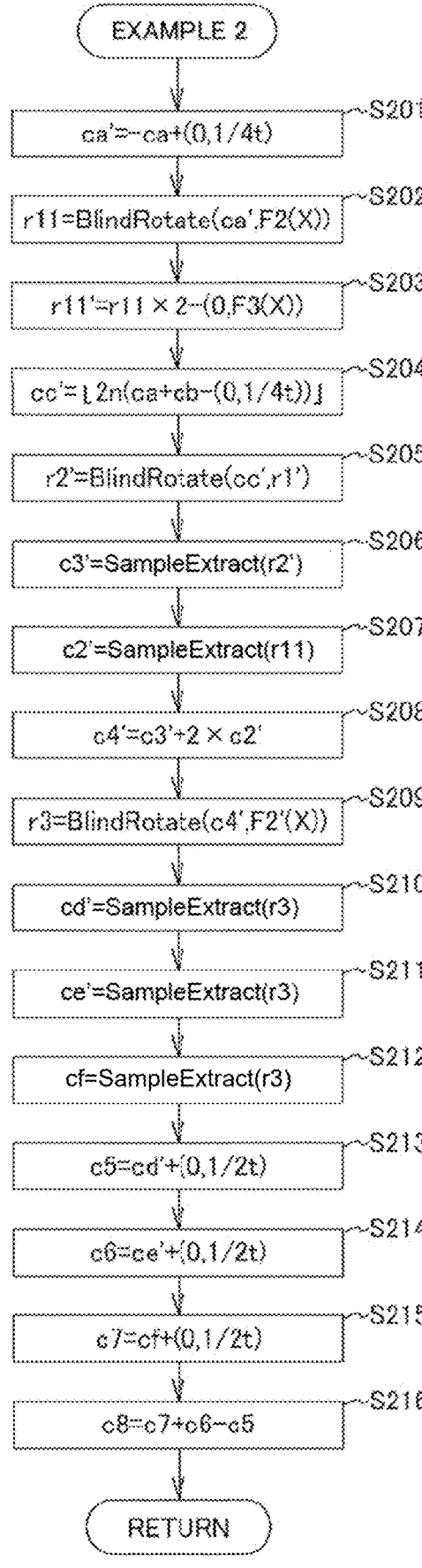
FIG. 15 is a flowchart for explaining a processes in Example 2.

FIG. 15 is a flowchart for explaining the processes in Example 2.

At Step S201, the encryption processing apparatus 1 (the first operation unit 12) performs a homomorphic operation $-ca+(0, 1/(4t))$ for the ciphertext ca to obtain the TLWE ciphertext ca'.

At Step S202, the encryption processing apparatus 1 (the first Bootstrapping unit 41) performs BlindRotate for the TLWE ciphertext ca' obtained at Step S201 by using the polynomial F2(X) as a test vector polynomial to obtain the TRLWE ciphertext r11.

At Step S203, the encryption processing apparatus 1 (the second operation unit 13) performs a homomorphic operation $r11 \times 2-(0, F3(X))$ for the TRLWE ciphertext r11, thereby obtaining the TRLWE ciphertext r11'.

At Step S204, the encryption processing apparatus 1 (the third operation unit 14) performs a homomorphic operation $2n \times (ca+cb-(0, 1/(4t)))$ for the TLWE ciphertext ca and the TLWE ciphertext cb and rounds the result of the homomorphic operation, thereby obtaining the TLWE ciphertext cc'.

At Step S205, the encryption processing apparatus 1 (the second Bootstrapping unit 42) performs BlindRotate for the TLWE ciphertext cc' by using the TRLWE ciphertext r11' as a test vector polynomial to obtain the TRLWE ciphertext r2'.

At Step S206, the encryption processing apparatus 1 (the second Bootstrapping unit 42) performs SampleExtract for the TRLWE ciphertext r2' to obtain the TLWE ciphertext c3'.

At Step S207, the encryption processing apparatus 1 (the first Bootstrapping unit 41) performs SampleExtract for the TRLWE ciphertext r11 to obtain the TLWE ciphertext c2'.

At Step S208, the encryption processing apparatus 1 (the fourth operation unit 15) performs a homomorphic operation c3'+2×c2' for the TLWE ciphertext c3' and the TLWE ciphertext c2', thereby obtaining the TLWE ciphertext c4'.

At Step S209, the encryption processing apparatus 1 (the third Bootstrapping unit 43) performs BlindRotate for the TLWE ciphertext c4' by using the polynomial F2'(X) as a test vector polynomial to obtain the TRLWE ciphertext r3.

At Step S210, Step S211, and Step S212, the encryption processing apparatus 1 (the third Bootstrapping unit 43) performs SampleExtract for the TRLWE ciphertext r3 three times at different portions, thereby obtaining the TLWE ciphertexts cd', ce' and cf.

At Step S213, Step S214, and Step S215, the encryption processing apparatus 1 (the fifth operation unit 16) performs homomorphic addition of adding a trivial ciphertext (0, 1/(2t)) to the TLWE ciphertexts cd', ce' and cf, thereby obtaining the TLWE ciphertexts c5, c6, and c7, respectively. The homomorphic addition may be executed every time SampleExtract is executed. The homomorphic addition at Step S204 may be executed before or in the course of the processes at Steps S201 to S203.

At Step S216, the encryption processing apparatus 1 (the sixth operation unit 17) performs a homomorphic operation of c7+c6−c5 to obtain the TLWE ciphertext c8 corresponding to a comparison result.

Figures 16A, 16B:
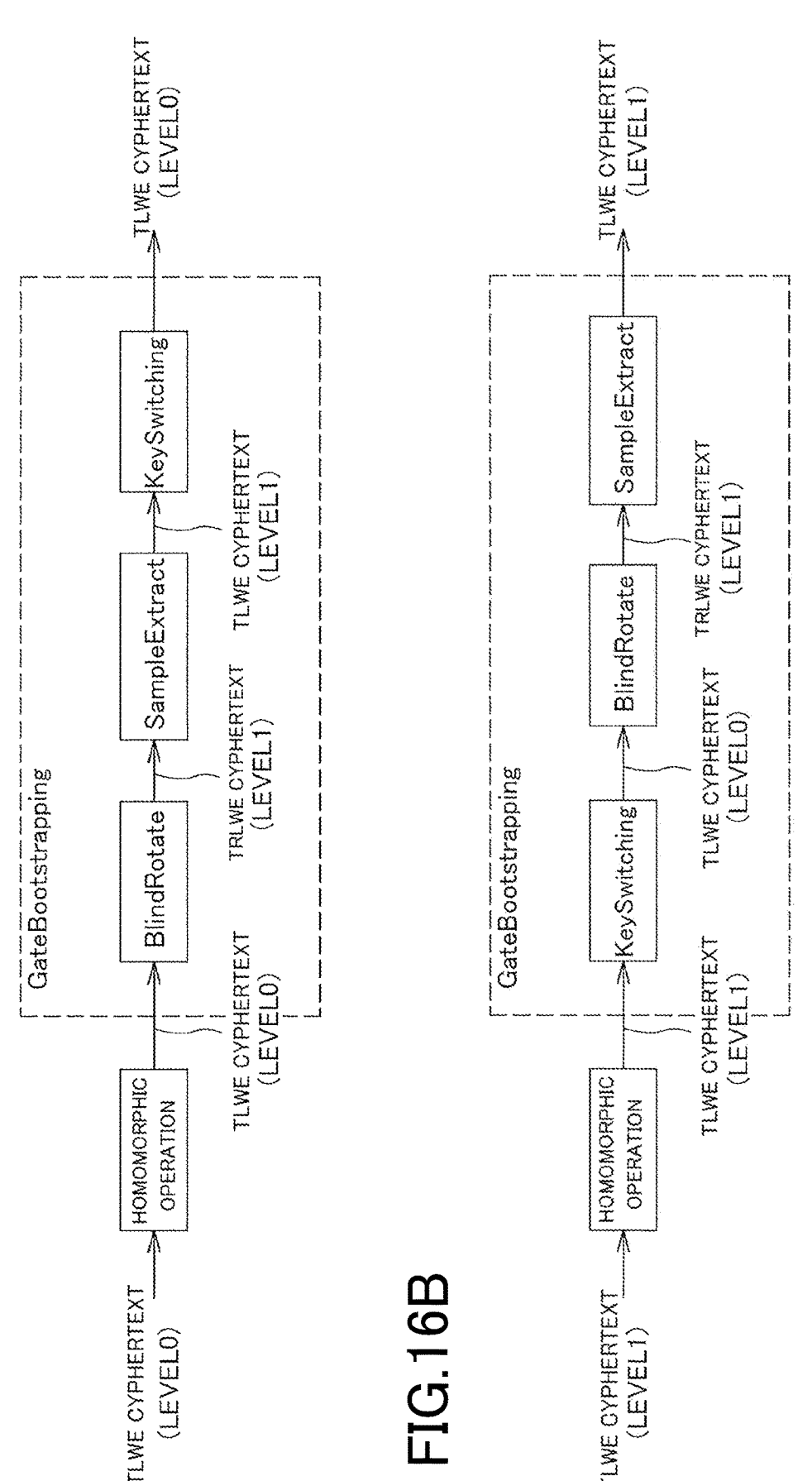
FIGS. 16A and 16B are diagrams illustrating ciphertexts input to and output from Gate Bootstrapping according to the present embodiment.

FIGS. 16A and 16B are diagrams illustrating ciphertexts input to and output from Gate Bootstrapping according to the present embodiment.

In the above descriptions, a case of performing Gate Bootstrapping in the order of BlindRotate, SampleExtract, and Public Key Switching, such as the case of the fourth calculation unit 41, has been described, as illustrated in FIG. 16A.

The order is not limited thereto. In Gate Bootstrapping, Public Key Switching can be performed first, and thereafter BlindRotate and SampleExtract can be performed, as illustrated in FIG. 16B.

As for TLWE ciphertexts, there is a concept of levels depending on security strengths.

In Gate Bootstrapping in FIG. 16A, TLWE ciphertexts as input and output are at LEVEL0. A TLWE ciphertext obtained by performing BlindRotate for a LEVEL0 TLWE ciphertext and performing SampleExtract for a TRLWE ciphertext as the output of BlindRotate is at LEVEL1. However, as a result of Public Key Switching, a LEVEL0 TLWE ciphertext is output.

Meanwhile, in the method illustrated in FIG. 16B, TLWE ciphertexts as input and output of Gate Bootstrapping are set to LEVEL1, and Public Key Switching is performed first to lower the level to LEVEL0. In this state, BlindRotate is performed. When SampleExtract is then performed for the TRLWE ciphertext as the output of BlindRotate, a LEVEL1 TLWE ciphertext is output.

The LEVEL0 ciphertext is formed by an N-th order vector [a] of elements on the circle group {T} encrypted with an N-th order private key [s]. Meanwhile, the LEVEL1 ciphertext obtained as a result of SampleExtract is formed by an n-th order vector [a'] of elements on the circle group {T} encrypted with an n-th order private key [s'].

In the LEVEL0 ciphertext, the number of coefficients (the order of the vector) contributing to difficulty of the LWE problem is smaller than that in the LEVEL1 ciphertext, and thus the amount of calculation of homomorphic addition is smaller as compared with the LEVEL1 ciphertext.

On the other hand, the LEVEL0 ciphertext has a problem that the security strength tends to decrease when an allowable error added to a plaintext is made small. This is because in LWE encryption, the security is ensured by the error added to the plaintext.

In TLWE encryption, calculation (decipher) is more difficult as the error added to the plaintext is larger and the number of coefficients (the order of the vector) is larger.

In other words, regarding TLWE encryption, the smaller the error added to the plaintext is and the smaller the number of coefficients (the order of the vector) is, the easier calculation (decipher) is.

In particular, in TFHE applied to the Integer-wise type, it is necessary to divide the range from 0 to 1 of the circle group {T} more finely as the value of the plaintext (integer) stored in a TLWE ciphertext becomes larger. Thus, an error needs to be made smaller also because of a problem of an error in decryption which will be described later. In this case, the security strength tends to decrease, as described above. Therefore, in order to make the error smaller, it is necessary to ensure security by increasing the number of coefficients (the order of the vector) in the ciphertext.

In order to ensure the security of the ciphertext that is easy to calculate (decipher) by reducing the error added to the plaintext, it is desirable to move Public Key Switching to the beginning of Gate Bootstrapping and to use the LEVEL1 ciphertexts, having a large number of coefficients (the order of the vector) and is easy to make an error range smaller, as input and output of Gate Bootstrapping. Then, after conversion to LEVEL0 is performed at the beginning of Gate Bootstrapping, the level is not returned to LEVEL0 at the end. By not returning the level to the LEVEL0, it is possible to safely perform calculation of the TLWE ciphertext also in the next stage.

The time required for BlindRotate is proportional to the number of coefficients (the order of the vector) of the input TLWE ciphertext, because the number of times of CMux is the same as the order. Therefore, when the LEVEL1 ciphertext is input, the time required for BlindRotate becomes longer in proportion to the number of coefficients (the order of the vector) than when the LEVEL0 ciphertext is input.

Even if a LEVEL1 ciphertext is input to Gate Bootstrapping in order to ensure the security of the ciphertext, it is possible to avoid increase in the required time by performing BlindRotate using the LEVEL0 TLWE ciphertext obtained by conversion by Public Key Switching as input.

Further, making an error to be added to a plaintext smaller has a problem of an error in decryption in addition to the above-described problem of security strength.

As described above, in TFHE applied to Integer-wise type, the range from 0 to 1 associated with the circle group {T} is divided into 2t. When the value of t is made larger and the circle group is more finely divided, the integer value that can be recorded in a TLWE ciphertext can be further increased. The maximum value that can be stored is determined by the number t of divisions of the circle group. However, since it is necessary to make the error range smaller in order to store a large value, there are a problem that the security strength decreases and a problem that the decryption error rate increases.

In LWE homomorphic encryption including TFHE, errors added to plaintexts are distributed in the normal distribution, and it is not possible to strictly set an "error range".

In principle, it is only possible to concentrate more errors in a specified range, although there is no change in the concentration around 0.

When the error is out of the set range, the corresponding plaintext is interpreted as another plaintext, and thus an unexpected calculation result may be obtained.

The calculation itself does not become impossible, but only a different result is obtained. How much probability that a different calculation result is obtained is acceptable depends on the application to which homomorphic encryption is applied.

It is necessary to set a system parameter to make the overlap of error ranges fall within certain values in order to best balance three objectives of suppressing the probability of occurrence of an error in calculation, speeding up calculation by reducing the number of times of BlindRotate, and maintaining high security.

The error may be set so as to satisfy a particularly important condition in accordance with a system or an apparatus to which the present embodiment is applied.

Application Example

The encryption processing apparatus 1 performs an operation of comparing ciphertexts by the functions of the first operation unit 12, the second operation unit 13, the third operation unit 14, the fourth operation unit 15, the fifth operation unit 16, the sixth operation unit 17, the first Bootstrapping unit 41, the second Bootstrapping unit 42, the third Bootstrapping unit 43, and the fourth Bootstrapping unit 44.

By performing the comparison operation, it is possible to obtain the presence or absence of a carry or a borrow which is required for an operation of multiple precision integers by calculation.

The processes performed by the encryption processing apparatus 1 by using multiple precision integers can be applied as follows.

Specific application examples include fuzzy authentication such as biometric authentication (since this authentication uses data that does not change over a lifetime, it is an absolute condition to conceal the data, and determination is made whether to match the data by using a threshold value), fuzzy search that searches an encrypted database for ambiguous and close data, and query aggregation from the encrypted database.

Fuzzy authentication is biometric authentication using, for example, biometric authentication data, and it is an absolute condition that biometric authentication data that does not change over a lifetime is encrypted and concealed.

In fuzzy authentication, authentication is performed based on a correspondence between biometric authentication data presented as an authentication request and biometric authentication data registered in a database. It is determined whether both the data match each other with a threshold, instead of determining whether both the data completely match each other, because, even if biological information is measured accurately, it is not always possible to obtain exactly the same value.

Fuzzy search is an ambiguous search method in which data close to a query is presented as a search result from a database even if the query and a record do not completely match.

In fuzzy authentication and fuzzy search, various operations have to be performed for data encrypted by homomorphic encryption when a query to the encrypted database is executed. For example, in a case of using the Euclidean distance for calculating the degree of coincidence with a fingerprint registered in fuzzy authentication, it is necessary to calculate $x^2$. Further, in a case of converting the scale for normalization of a vector, for example, multiplication of the scale, i.e., a first-order polynomial needs to be calculated. In order to evaluate the similarity between sentences, it is necessary to obtain cosine similarity by dividing the inner product of two vectors by their respective norms.

As a result of these operations, an index indicating how close to a target is represented by the magnitude of the value, and thereafter a comparison operation is required to determine whether to adopt the result or whether to perform authentication. This comparison operation can be performed by using the comparison operation by the encryption processing apparatus 1 according to the present embodiment and an operation of multiple precision integers as the application thereof.

Figure 17:
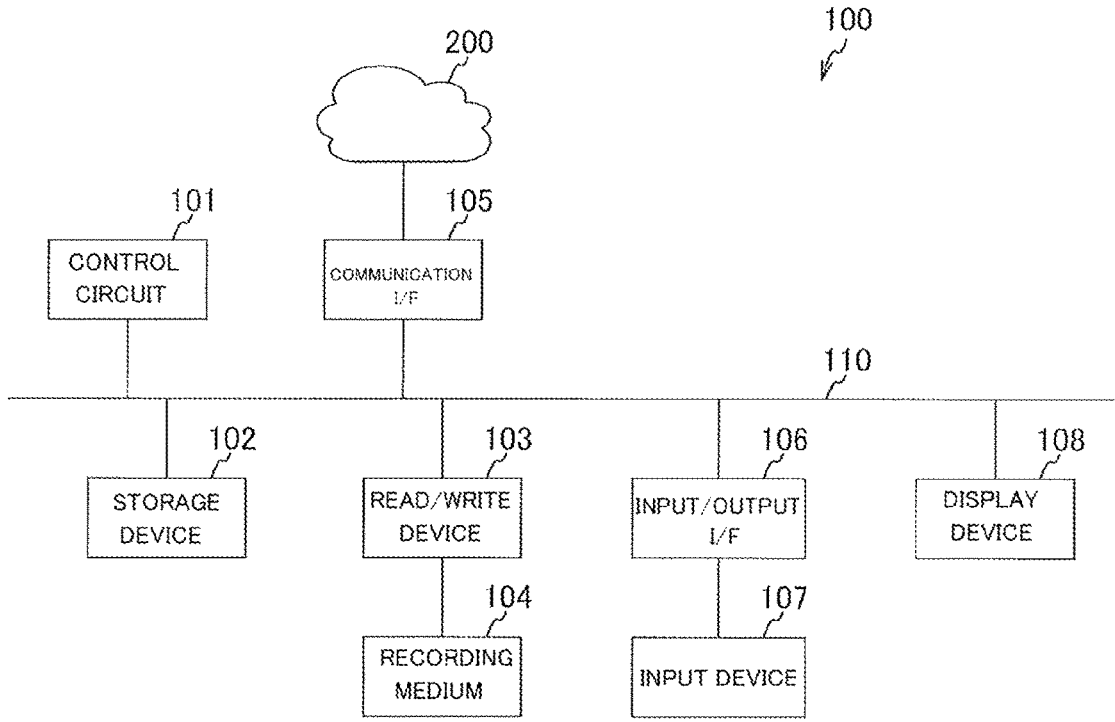
FIG. 17 is a block diagram illustrating an example of a computer apparatus.

FIG. 17 is a block diagram illustrating an example of a computer apparatus.

A configuration of a computer apparatus 100 is described with reference to FIG. 17.

The computer apparatus 100 is, for example, an encryption processing apparatus that processes various types of information. The computer apparatus 100 includes a control circuit 101, a storage device 102, a read/write device 103, a recording medium 104, a communication interface 105, an input/output interface 106, an input device 107, and a display device 108. The communication interface 105 is connected to a network 200. The respective constituent elements are mutually connected to one another via a bus 110.

The encryption processing apparatus 1 can be configured by selecting a part of or all elements from the constituent elements incorporated in the computer apparatus 100 as appropriate.

The control circuit 101 controls the entire computer apparatus 100. For example, the control circuit 101 is a processor such as a Central Processing Unit (CPU), a Field Programmable Gate Array (FPGA), an Application Specific Integrated Circuit (ASIC), and a Programmable Logic Device (PLD). The control circuit 101 functions as the controller 10 in FIG. 1, for example.

The storage device 102 stores various types of data therein. For example, the storage device 102 is a memory such as a Read Only Memory (ROM) and a Random Access Memory (RAM), or a non-transitory computer-readable recording medium such as a Hard Disk (HD) and a Solid State Drive (SSD). The storage device 102 may store therein an information processing program that causes the control circuit 101 to function as the controller 10 in FIG. 1. The storage device 102 functions as the storage unit 20 in FIG. 1, for example. The information processing program is a program for causing a processor to perform an encryption process of processing ciphertexts, for example.

The encryption processing apparatus 1 loads a program stored in the storage device 102 into a RAM when performing information processing.

The encryption processing apparatus 1 executes the program loaded to the RAM by the control circuit 101, thereby executing processing that includes at least one of the first operation process, the second operation process, the third operation process, the fourth operation process, the fifth operation process, the sixth operation process, the first Bootstrapping process, the second Bootstrapping process, the third Bootstrapping process, the fourth Bootstrapping process, and an output process.

The program may be stored in a storage device included in a server on the network 200, as long as the control circuit 101 can access that program via the communication interface 105.

The read/write device 103 is controlled by the control circuit 101, and reads data in the removable recording medium 104 and writes data to the removable recording medium 104.

The recording medium 104 stores various types of data therein. The recording medium 104 stores information processing program therein, for example. For example, the recording medium 104 is a non-transitory computer-readable recording medium such as a Secure Digital (SD) memory card, a Floppy Disk (FD), a Compact Disc (CD), a Digital Versatile Disk (DVD), a Blu-ray (registered trademark) Disk (BD), and a flash memory.

The communication interface 105 connects the computer apparatus 100 and another device to each other via the network 200 in a communicable manner. The communication interface 105 functions as the communication unit 25 in FIG. 1, for example.

The input/output interface 106 is, for example, an interface that can be connected to various types of input devices in a removable manner. Examples of the input device 107 connected to the input/output interface 106 include a keyboard and a mouse. The input/output interface 106 connects each of the various types of input devices connected thereto and the computer apparatus 100 to each other in a communicable manner. The input/output interface 106 outputs a signal input from each of the various types of input devices connected thereto to the control circuit 101 via the bus 110. The input/output interface 106 also outputs a signal output from the control circuit 101 to an input/output device via the bus 110. The input/output interface 106 functions as the input unit 26 in FIG. 1, for example.

The display device 108 displays various types of information. The display device 108 is, for example, a CRT (Cathode Ray Tube), an LCD (Liquid Crystal Display), a PDP (Plasma Display Panel), and an OELD (Organic Electroluminescence Display). The network 200 is, for example, a LAN, wireless communication, a P2P network, or the Internet and communicably connects the computer apparatus 100 to other devices.

The present embodiment is not limited to the embodiment described above and various configurations or embodiments can be applied within a scope not departing from the gist of the present embodiment.

All examples and condition statements aided herein are intended for educational purposes to help the reader understand the concepts contributed by the inventor to further the invention and the art, and are to be construed as not limited to such specifically aided examples and conditions, and the construction of such examples is not relevant to depicting the superiority of the invention. While embodiments of the invention have been described in detail, it is to be understood that various changes, substitutions, and modifications may be made herein without departing from the spirit and scope of the invention.

What is claimed is:

1. An encryption processing apparatus that processes an input ciphertext, the input ciphertext being a fully homomorphic ciphertext that has a value obtained by adding an error with a predetermined variance to a predetermined value, as a plaintext associated with an integer and that enables a predetermined operation between integers without decryption, the apparatus comprising a processor that executes a process including:

rotating coefficients of a first polynomial according to a first ciphertext to obtain a second ciphertext having a second polynomial as a plaintext, wherein the first ciphertext is a result of a homomorphic operation on the input ciphertext;

performing a homomorphic operation on the second polynomial and the second ciphertext to obtain a third ciphertext having a third polynomial as a plaintext; and utilizing the third ciphertext as the third polynomial, rotating coefficients of the third ciphertext according to a fourth ciphertext to obtain a ninth ciphertext having a fifth polynomial and extracting a coefficient of a constant term of the fifth polynomial, to obtain a fifth ciphertext, wherein the process processes a query over an encrypted database by performing the predetermined operation, the query being based on the input ciphertext.

2. The encryption processing apparatus according to claim 1, wherein the process executed by the processor sets coefficients of either one of even order terms and odd order terms to 0 in the first polynomial to keep the coefficients of the one of the even order terms and the odd order terms unchanged by rotating coefficients of the first polynomial according to the first ciphertext, and executes different operations using the fourth ciphertext at the same time by using coefficients of each of even order terms and odd order terms in the first polynomial and coefficients in the second polynomial respectively corresponding thereto, included in the third ciphertext.

3. The encryption processing apparatus according to claim 1, wherein the predetermined operation is an operation using multiple precision integers.

4. The encryption processing apparatus according to claim 1, wherein the fourth ciphertext is a homomorphic operation result ciphertext corresponding to a result of a homomorphic operation between the input ciphertext and another ciphertext, and the process executed by the processor rotates coefficients of a fourth polynomial according to a ciphertext obtained by a homomorphic operation between a ciphertext extracted from the second ciphertext and the fifth ciphertext and extracts a predetermined term to obtain at least one of a sixth ciphertext indicating presence or absence of a carry in the fourth ciphertext, a seventh ciphertext indicating presence or absence of a borrow in the fourth ciphertext, and an eighth ciphertext indicating whether a result of the homomorphic operation is positive or negative.

5. The encryption processing apparatus according to claim 4, wherein the process executed by the processor obtains a comparison result ciphertext corresponding to a result of comparison between the input ciphertext and the other ciphertext based on the sixth ciphertext, the seventh ciphertext, and the eighth ciphertext.

6. The encryption processing apparatus according to claim 4, wherein the process executed by the processor rotates coefficients of a sixth polynomial corresponding to the fourth ciphertext to obtain the ninth ciphertext and extracts the coefficient of the fifth polynomial to obtain the fifth ciphertext, wherein the fifth ciphertext corresponds to a result of homomorphic addition/subtraction as the homomorphic operation result between the input ciphertext and the other ciphertext.

7. The encryption processing apparatus according to claim 1, wherein the second ciphertext having the second polynomial as the plaintext is a trivial ciphertext decryptable with any private key.

8. The encryption processing apparatus according to claim 1, wherein the process executed by the processor performs a process related to fuzzy authentication or fuzzy search which uses the input ciphertext, by performing the predetermined operation, wherein the fuzzy authentication is performed based on a correspondence between biometric authentication data presented as an authentication request and biometric authentication data registered in a database.

9. The encryption processing apparatus according to claim 1, wherein the homomorphic operation is a homomorphic addition or homomorphic subtraction.

10. An encryption processing method that is executed by a processor and processes an input ciphertext, the input ciphertext being a fully homomorphic ciphertext that has a value obtained by adding an error with a predetermined variance to a predetermined value, as a plaintext associated with an integer and that enables a predetermined operation between integers without decryption, the method comprising:

rotating coefficients of a first polynomial according to a first ciphertext to obtain a second ciphertext having a second polynomial as a plaintext, wherein the first ciphertext is a result of a homomorphic operation on the input ciphertext;

performing a homomorphic operation on the second polynomial and the second ciphertext to obtain a third ciphertext having a third polynomial as a plaintext; and utilizing the third ciphertext as the third polynomial, rotating coefficients of the third ciphertext according to a fourth ciphertext to obtain a ninth ciphertext having a fifth polynomial and extracting a coefficient of a constant term of the fifth polynomial, thereby to obtain a fifth ciphertext, wherein the process processes a query over an encrypted database by performing the predetermined operation, the query being based on the input ciphertext.

11. A non-transitory computer-readable recording medium storing a program for causing a processor to execute an encryption process that processes an input ciphertext, the input ciphertext being a fully homomorphic ciphertext that has a value obtained by adding an error with a predetermined variance to a predetermined value, as a plaintext associated with an integer and that enables a predetermined operation between integers without decryption, the encryption process comprising:

rotating coefficients of a first polynomial according to a first ciphertext to obtain a second ciphertext having a second polynomial as a plaintext, wherein the first ciphertext is a result of a homomorphic operation on the input ciphertext;

performing a homomorphic operation on the second polynomial and the second ciphertext to obtain a third ciphertext having a third polynomial as a plaintext; and utilizing the third ciphertext as the third polynomial, rotating coefficients of the third ciphertext according to a fourth ciphertext to obtain a ninth ciphertext having a fifth polynomial and extracting a coefficient of a constant term of the fifth polynomial, thereby to obtain a fifth ciphertext, wherein the process processes a query over an encrypted database by performing the predetermined operation, the query being based on the input ciphertext.

\* \* \* \* \*